US012243381B2

(12) United States Patent
Taylor et al.

(10) Patent No.: US 12,243,381 B2
(45) Date of Patent: *Mar. 4, 2025

(54) BEACON TO PATRON COMMUNICATIONS FOR ELECTRONIC GAMING DEVICES

(71) Applicant: Aristocrat Technologies, Inc., Las Vegas, NV (US)

(72) Inventors: Eric Taylor, Carson City, NV (US); Damian Tarnawsky, Las Vegas, NV (US); Scott Kania, Sparks, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,177

(22) Filed: Jan. 22, 2024

(65) Prior Publication Data

US 2024/0169789 A1 May 23, 2024

Related U.S. Application Data

(63) Continuation of application No. 18/061,979, filed on Dec. 5, 2022, now Pat. No. 11,972,660, which is a
(Continued)

(51) Int. Cl.
*G07F 17/32* (2006.01)
*G06F 16/955* (2019.01)
(Continued)

(52) U.S. Cl.
CPC ........ *G07F 17/3223* (2013.01); *G06F 16/955* (2019.01); *G07F 17/3239* (2013.01);
(Continued)

(58) Field of Classification Search
CPC ............ G07F 17/3223; G07F 17/3239; G07F 17/3255; G06F 16/955; H04W 4/06; H04W 4/12; H04W 4/80; H04W 4/023
(Continued)

(56) References Cited

U.S. PATENT DOCUMENTS

D305,704 S    1/1990 Jones
4,986,330 A   1/1991 McGonagle
(Continued)

FOREIGN PATENT DOCUMENTS

AU    2008309026 A1    4/2009
BR    102020006852 A2  10/2021
(Continued)

OTHER PUBLICATIONS

Office Action (Final Rejection) dated May 26, 2023 for U.S. Appl. No. 17/347,321 (pp. 1-26).
(Continued)

*Primary Examiner* — Pierre E Elisca
(74) *Attorney, Agent, or Firm* — Armstrong Teasdale LLP

(57) ABSTRACT

A system for proximity-based digital interactions includes a beacon transmitter configured to wirelessly broadcast a first interaction prompt message that includes a first interaction event code. A system server is configured to: receive an event activation message that includes the first interaction event code; identify and perform a first pre-programmed action; identify proximity between a mobile computing device and the beacon transmitter based on receipt of the first interaction event code from the mobile computing device; create a second interaction event code that is targeted to be performed by the mobile computing device; and transmit a configuration message to the beacon transmitter that includes the second interaction event code, causing the beacon transmitter to begin broadcasting a second interaction prompt message including the second interaction event code together with the first interaction prompt message, where the first interaction event code is different than the second interaction even code.

20 Claims, 9 Drawing Sheets

Related U.S. Application Data continuation of application No. 17/211,521, filed on Mar. 24, 2021, now Pat. No. 11,544,994.

(60) Provisional application No. 63/000,994, filed on Mar. 27, 2020.

(51) Int. Cl.
  *H04W 4/06* (2009.01)
  *H04W 4/12* (2009.01)
  *H04W 4/80* (2018.01)

(52) U.S. Cl.
  CPC .......... *G07F 17/3255* (2013.01); *H04W 4/06* (2013.01); *H04W 4/12* (2013.01); *H04W 4/80* (2018.02)

(58) Field of Classification Search
  USPC .......................................................... 463/42
  See application file for complete search history.

(56) References Cited

U.S. PATENT DOCUMENTS

| | | | |
|---|---|---|---|
| 5,944,432 | A | 8/1999 | Richardson |
| D427,783 | S | 7/2000 | Luedke |
| 6,230,658 | B1 | 5/2001 | Rudolph |
| 6,278,122 | B1 | 8/2001 | Gagnon |
| 6,394,907 | B1 | 5/2002 | Rowe |
| 6,510,572 | B2 | 1/2003 | Horowitz |
| 6,585,598 | B2 | 7/2003 | Nguyen |
| 6,739,975 | B2 | 5/2004 | Nguyen |
| 6,835,134 | B2 | 12/2004 | Poole |
| 6,846,238 | B2 | 1/2005 | Wells |
| 6,866,586 | B2 | 3/2005 | Oberberger |
| 6,925,307 | B1 | 8/2005 | Mamdani |
| 7,114,718 | B2 | 10/2006 | Grauzer |
| 7,169,053 | B2 | 1/2007 | Moik |
| 7,240,036 | B1 | 7/2007 | Mamdani |
| 7,285,046 | B2 | 10/2007 | Papulov |
| 7,370,012 | B2 | 5/2008 | Karns |
| 7,390,263 | B1 | 6/2008 | Acres |
| 7,419,428 | B2 | 9/2008 | Rowe |
| 7,559,462 | B2 | 7/2009 | Brosnan |
| 7,749,079 | B2 | 7/2010 | Chamberlain |
| 7,771,277 | B2 | 8/2010 | Chamberlain |
| 7,819,742 | B2 | 10/2010 | Chamberlain |
| 7,918,728 | B2 | 4/2011 | Nguyen |
| D641,560 | S | 7/2011 | Thompson |
| 7,997,978 | B2 | 8/2011 | Kaminkow |
| 8,057,303 | B2 | 11/2011 | Rasmussen |
| 8,110,819 | B2 | 2/2012 | Boyarsky |
| D660,022 | S | 5/2012 | Thompson |
| 8,226,255 | B2 | 7/2012 | Fan |
| 8,333,653 | B2 | 12/2012 | Nyman |
| 8,382,582 | B2 | 2/2013 | Sammon |
| 8,393,955 | B2 | 3/2013 | Arezina |
| 8,449,378 | B2 | 5/2013 | Michaelson |
| 8,463,711 | B2 | 6/2013 | Cunningham, II |
| 8,469,800 | B2 | 6/2013 | Lemay |
| 8,523,657 | B2 | 9/2013 | Michaelson |
| 8,602,874 | B2 | 12/2013 | Rowe |
| 8,613,659 | B2 | 12/2013 | Nelson |
| D702,068 | S | 4/2014 | Mitten |
| 8,714,655 | B2 | 5/2014 | Cahall |
| 8,870,647 | B2 | 10/2014 | Huizinga |
| 8,875,639 | B2 | 11/2014 | Summerville |
| 8,956,222 | B2 | 2/2015 | Lemay |
| 8,961,298 | B2 | 2/2015 | Czyzewski |
| 8,992,306 | B2 | 3/2015 | Iddings |
| D726,424 | S | 4/2015 | Nguyen |
| 9,022,855 | B2 | 5/2015 | Radisich |
| 9,058,716 | B2 | 6/2015 | Rajaraman |
| 9,153,095 | B2 | 10/2015 | Adiraju |
| 9,159,189 | B2 | 10/2015 | Froy, Jr. |
| 9,167,383 | B1 | 10/2015 | Barrand |
| 9,226,578 | B2 | 1/2016 | Battey |
| 9,235,953 | B2 | 1/2016 | Earley |
| 9,245,414 | B2 | 1/2016 | Radisich |
| 9,269,231 | B2 | 2/2016 | Curtin |
| 9,311,769 | B2 | 4/2016 | Lemay |
| 9,317,995 | B2 | 4/2016 | Nyman |
| 9,324,209 | B2 | 4/2016 | Cunningham, II |
| 9,367,835 | B2 | 6/2016 | Nelson |
| 9,418,519 | B2 | 8/2016 | Walker |
| 9,437,073 | B2 | 9/2016 | Lestrange |
| 9,454,872 | B2 | 9/2016 | Muir |
| 9,483,901 | B2 | 11/2016 | Nguyen |
| 9,501,899 | B2 | 11/2016 | Radisich |
| D774,339 | S | 12/2016 | Parshad |
| 9,530,277 | B2 | 12/2016 | Nelson |
| D777,459 | S | 1/2017 | Parshad |
| 9,576,425 | B2 | 2/2017 | Nguyen |
| 9,580,031 | B2 | 2/2017 | Kalis |
| 9,613,491 | B2 | 4/2017 | Roth |
| 9,615,347 | B1 | 4/2017 | Kerr |
| 9,629,064 | B2 | 4/2017 | Graves |
| 9,659,444 | B2 | 5/2017 | Norris |
| 9,666,027 | B2 | 5/2017 | Curtin |
| D796,216 | S | 9/2017 | Rockwell |
| 9,756,607 | B1 | 9/2017 | Deluca |
| 9,786,123 | B2 | 10/2017 | Huizinga |
| 9,852,578 | B2 | 12/2017 | Nelson |
| D807,652 | S | 1/2018 | Kawamoto |
| 9,875,499 | B2 | 1/2018 | Washington |
| 9,875,607 | B2 | 1/2018 | Nelson |
| 9,881,444 | B2 | 1/2018 | Nelson |
| 9,928,502 | B2 | 3/2018 | Curtin |
| 9,928,689 | B2 | 3/2018 | Walker |
| 9,941,753 | B2 | 4/2018 | Asanuma |
| 9,961,507 | B1 | 5/2018 | Mendelson |
| 9,974,873 | B2 | 5/2018 | Cole |
| 9,974,875 | B2 | 5/2018 | Davis |
| 9,999,699 | B2 | 6/2018 | Sinai |
| 10,009,868 | B1 | 6/2018 | Reyes |
| 10,013,850 | B2 | 7/2018 | Nelson |
| 10,032,334 | B2 | 7/2018 | Cuddy |
| 10,097,018 | B2 | 10/2018 | Park |
| 10,121,129 | B2 | 11/2018 | Kalgi |
| 10,121,318 | B2 | 11/2018 | Lemay |
| 10,121,319 | B2 | 11/2018 | Radisich |
| 10,131,432 | B2 | 11/2018 | Simeon |
| 10,134,223 | B2 | 11/2018 | Mandava |
| 10,134,234 | B2 | 11/2018 | Lestrange |
| 10,140,810 | B1 | 11/2018 | Boyle |
| 10,157,518 | B2 | 12/2018 | Johnson |
| 10,158,243 | B2 | 12/2018 | Kim |
| 10,192,400 | B2 | 1/2019 | Price |
| 10,192,401 | B2 | 1/2019 | Nelson |
| 10,198,906 | B2 | 2/2019 | Walker |
| 10,217,317 | B2 | 2/2019 | Nelson |
| 10,242,525 | B1 | 3/2019 | Knust |
| 10,242,530 | B2 | 3/2019 | Arnone |
| D848,159 | S | 5/2019 | Hiyoshi |
| D848,160 | S | 5/2019 | Hiyoshi |
| 10,282,939 | B2 | 5/2019 | Yamaguchi |
| 10,297,105 | B2 | 5/2019 | Lemay |
| 10,339,755 | B2 | 7/2019 | Snow |
| 10,360,761 | B2 | 7/2019 | Higgins |
| 10,360,763 | B2 | 7/2019 | Higgins |
| 10,373,430 | B2 | 8/2019 | Higgins |
| 10,380,843 | B2 | 8/2019 | Higgins |
| 10,417,867 | B2 | 9/2019 | Nelson |
| 10,453,297 | B2 | 10/2019 | Lemay |
| 10,456,488 | B2 | 10/2019 | Bilenko |
| 10,460,560 | B2 | 10/2019 | Cunningham, II |
| 10,460,563 | B2 | 10/2019 | Miri |
| D870,473 | S | 12/2019 | Hamilton |
| 10,529,179 | B2 | 1/2020 | Weiss |
| 10,546,463 | B2 | 1/2020 | Higgins |
| D874,164 | S | 2/2020 | Hamilton |
| 10,573,129 | B2 | 2/2020 | Higgins |
| 10,621,826 | B2 | 4/2020 | Higgins |
| 10,643,426 | B2 | 5/2020 | Higgins |
| 10,699,527 | B2 | 6/2020 | Higgins |

(56) References Cited

U.S. PATENT DOCUMENTS

| | | |
|---|---|---|
| 10,706,683 B2 | 7/2020 | Higgins |
| 10,720,016 B2 | 7/2020 | Nelson |
| 10,726,668 B2 | 7/2020 | Nelson |
| 10,755,520 B2 | 8/2020 | Moore |
| 10,769,885 B2 | 9/2020 | Hoehne |
| 10,783,416 B2 | 9/2020 | Shigeta |
| 11,011,020 B2 | 5/2021 | Springer |
| 11,024,088 B2 | 6/2021 | Heinen |
| 11,087,587 B2 | 8/2021 | Palmisano |
| 11,094,161 B2 | 8/2021 | Cleveland |
| 11,132,862 B2 | 9/2021 | Cleveland |
| 11,227,466 B2 | 1/2022 | Rousseau |
| D944,015 S | 2/2022 | Greenwood |
| 11,238,699 B2 | 2/2022 | Wingate |
| 11,276,271 B2 | 3/2022 | Taylor |
| 11,663,881 B2 | 5/2023 | Palmisano |
| 2002/0131445 A1 | 9/2002 | Skubic |
| 2005/0194827 A1 | 9/2005 | Dowty |
| 2006/0188389 A1 | 8/2006 | Levy |
| 2006/0199648 A1 | 9/2006 | Mitchell |
| 2007/0090335 A1 | 4/2007 | Legrand |
| 2007/0117604 A1 | 5/2007 | Hill |
| 2008/0045342 A1 | 2/2008 | Crowder |
| 2008/0067417 A1 | 3/2008 | Lane |
| 2008/0134601 A1 | 6/2008 | Cruz |
| 2008/0178774 A1 | 7/2008 | Saccani |
| 2008/0305855 A1 | 12/2008 | Czyzewski |
| 2009/0191933 A1 | 7/2009 | French |
| 2009/0218512 A1 | 9/2009 | Ranta |
| 2009/0252646 A1 | 10/2009 | Holden |
| 2009/0317436 A1 | 12/2009 | Wilson |
| 2010/0004051 A1 | 1/2010 | Walker |
| 2010/0312625 A1 | 12/2010 | Miller |
| 2011/0173574 A1 | 7/2011 | Clavin |
| 2011/0215261 A1 | 9/2011 | Lyslo |
| 2011/0227391 A1 | 9/2011 | Cahall |
| 2011/0256019 A1 | 10/2011 | Gruen |
| 2011/0306400 A1 | 12/2011 | Nguyen |
| 2012/0127083 A1 | 5/2012 | Kushler |
| 2012/0190455 A1 | 7/2012 | Briggs |
| 2012/0252564 A1 | 10/2012 | Moore |
| 2013/0023339 A1 | 1/2013 | Davis |
| 2013/0084991 A1* | 4/2013 | LeMay .............. G07F 17/3206 463/42 |
| 2013/0165232 A1 | 6/2013 | Nelson |
| 2013/0252713 A1 | 9/2013 | Nelson |
| 2013/0303263 A1 | 11/2013 | Lemay |
| 2014/0015478 A1 | 1/2014 | Von Novak |
| 2014/0021798 A1 | 1/2014 | Kesler |
| 2014/0031107 A1 | 1/2014 | Walker |
| 2014/0203770 A1 | 7/2014 | Salter |
| 2014/0228109 A1 | 8/2014 | Azuma |
| 2015/0044098 A1 | 2/2015 | Smart |
| 2015/0086968 A1 | 3/2015 | Kolavo |
| 2015/0090903 A1 | 4/2015 | Cole |
| 2015/0228153 A1 | 8/2015 | Hedrick |
| 2015/0243133 A1 | 8/2015 | Nicholas |
| 2015/0254924 A1* | 9/2015 | Pececnik ............ G07F 17/3218 463/25 |
| 2016/0000951 A1 | 1/2016 | Kreiner |
| 2016/0027244 A1 | 1/2016 | Adiraju |
| 2016/0027249 A1* | 1/2016 | Nelson ............... G07F 17/3239 463/29 |
| 2016/0029155 A1 | 1/2016 | Kerr |
| 2016/0073218 A1 | 3/2016 | Shui |
| 2016/0092954 A1 | 3/2016 | Bassett |
| 2016/0098891 A1 | 4/2016 | Eby |
| 2016/0125319 A1 | 5/2016 | Morgan |
| 2016/0133089 A1 | 5/2016 | Roemer |
| 2016/0180656 A1 | 6/2016 | Loose |
| 2016/0183036 A1 | 6/2016 | Tung |
| 2016/0218545 A1 | 7/2016 | Schroeder |
| 2016/0234123 A1 | 8/2016 | Alisawi |
| 2016/0247354 A1 | 8/2016 | Arnone |
| 2016/0256785 A1 | 9/2016 | Sum |
| 2016/0282040 A1 | 9/2016 | Wenji |
| 2016/0283989 A1 | 9/2016 | Esquilla, Jr. |
| 2016/0333578 A1 | 11/2016 | Ng |
| 2016/0349929 A1 | 12/2016 | Clemons |
| 2017/0026788 A1 | 1/2017 | Kostka |
| 2017/0076540 A1 | 3/2017 | Saffari |
| 2017/0076546 A1 | 3/2017 | Walker |
| 2017/0084086 A1 | 3/2017 | Pio |
| 2017/0092054 A1 | 3/2017 | Petersen |
| 2017/0092059 A1 | 3/2017 | Nelson |
| 2017/0092060 A1 | 3/2017 | Toohey |
| 2017/0092061 A1 | 3/2017 | Nelson |
| 2017/0109770 A1 | 4/2017 | Kusens |
| 2017/0111770 A1 | 4/2017 | Kusens |
| 2017/0169657 A1 | 6/2017 | Keilwert |
| 2017/0213632 A1 | 7/2017 | Ozana |
| 2017/0278347 A1 | 9/2017 | Kukita |
| 2017/0279495 A1 | 9/2017 | Kim |
| 2017/0289154 A1 | 10/2017 | Krieger |
| 2017/0346919 A1 | 11/2017 | He |
| 2018/0005484 A1* | 1/2018 | Michel .............. G07F 17/3218 |
| 2018/0033244 A1 | 2/2018 | Northrup |
| 2018/0061179 A1 | 3/2018 | Miri |
| 2018/0075690 A1 | 3/2018 | Moore |
| 2018/0108213 A1 | 4/2018 | Sanford |
| 2018/0194471 A1 | 7/2018 | Merrick |
| 2018/0357850 A1 | 12/2018 | Moore |
| 2019/0066441 A1 | 2/2019 | Lestrange |
| 2019/0073873 A1 | 3/2019 | Lemay |
| 2019/0088086 A1 | 3/2019 | Rajendran |
| 2019/0096175 A1 | 3/2019 | Higgins |
| 2019/0096180 A1 | 3/2019 | Petersen |
| 2019/0102985 A1 | 4/2019 | Higgins |
| 2019/0139356 A1 | 5/2019 | Moya |
| 2019/0151752 A1 | 5/2019 | Kim |
| 2019/0164384 A1 | 5/2019 | Soukup |
| 2019/0172300 A1 | 6/2019 | Phillips |
| 2019/0188951 A1 | 6/2019 | Nelson |
| 2019/0188961 A1 | 6/2019 | Higgins |
| 2019/0188962 A1 | 6/2019 | Higgins |
| 2019/0188963 A1 | 6/2019 | Higgins |
| 2019/0197526 A1 | 6/2019 | Higgins |
| 2019/0197822 A1 | 6/2019 | Shepherd |
| 2019/0197830 A1 | 6/2019 | Petersen |
| 2019/0205866 A1 | 7/2019 | Higgins |
| 2019/0244476 A1 | 8/2019 | Miltenberger |
| 2019/0272704 A1 | 9/2019 | Lemay |
| 2019/0325701 A1 | 10/2019 | Higgins |
| 2020/0005595 A1 | 1/2020 | Nelson |
| 2020/0043284 A1 | 2/2020 | Lemay |
| 2020/0058190 A1 | 2/2020 | Cunningham, II |
| 2020/0111319 A1 | 4/2020 | Palmisano |
| 2020/0134973 A1 | 4/2020 | Higgins |
| 2020/0152005 A1 | 5/2020 | Higgins |
| 2020/0226881 A1* | 7/2020 | Warner .............. G07F 17/3248 |
| 2020/0302740 A1 | 9/2020 | Cleveland |
| 2020/0302746 A1 | 9/2020 | Cleveland |
| 2021/0019987 A1 | 1/2021 | Cohen |
| 2021/0241575 A1 | 8/2021 | Shepherd |
| 2021/0295636 A1 | 9/2021 | Cleveland |
| 2021/0386201 A1 | 12/2021 | Wilson |
| 2022/0019950 A1 | 1/2022 | Sabri |
| 2022/0092908 A1 | 3/2022 | Cleveland |
| 2022/0148380 A1 | 5/2022 | Wingate |
| 2022/0319272 A1 | 10/2022 | Shepherd |
| 2024/0127663 A1 | 4/2024 | Cleveland |

FOREIGN PATENT DOCUMENTS

| | | |
|---|---|---|
| CA | 2716403 A1 | 9/2009 |
| EP | 0979604 A1 | 2/2000 |
| EP | 3280643 B1 | 4/2020 |
| GB | 2273088 A | 6/1994 |
| GB | 2421217 A | 6/2006 |
| GB | 2421220 A | 6/2006 |
| GB | 2422807 A | 8/2006 |
| GB | 4010756 | 4/2009 |
| KR | 200353613 Y1 | 6/2004 |

(56) References Cited

FOREIGN PATENT DOCUMENTS

| KR | 20090059283 A | 6/2009 |
|---|---|---|
| WO | 1999059451 A1 | 11/1999 |
| WO | 2017196732 A1 | 11/2017 |

OTHER PUBLICATIONS

Office Action (Notice of Allowance and Fees Due (PTOL-85)) dated Jun. 8, 2023 for U.S. Appl. No. 17/219,634 (pp. 1-7).
Office Action (Notice of Allowance and Fees Due (PTOL-85)) dated Jun. 28, 2023 for U.S. Appl. No. 17/674,672 (pp. 1-8).
Office Action dated Apr. 29, 2020 for U.S. Appl. No. 16/264,875 (pp. 1-8).
Office Action (Non-Final Rejection) dated Jul. 25, 2023 for U.S. Appl. No. 18/061,979 (pp. 1-6).
Office Action (Notice of Allowance and Fees Due (PTOL-85)) dated Aug. 22, 2023 for U.S. Appl. No. 17/647,568 (pp. 1-8).
Office Action (Notice of Allowance and Fees Due (PTOL-85)) dated Sep. 20, 2023 for U.S. Appl. No. 17/491,348 (pp. 1-5).
Office Action (Notice of Allowance and Fees Due (PTOL-85)) dated Nov. 22, 2023 for U.S. Appl. No. 17/941,493 (pp. 1-8).
Office Action (Notice of Allowance and Fees Due (PTOL-85)) dated Nov. 27, 2023 for U.S. Appl. No. 18/061,979 (pp. 1-8).
Office Action (Notice of Allowance and Fees Due (PTOL-85)) dated Nov. 30, 2023 for U.S. Appl. No. 17/647,568 (pp. 1-2).
Office Action (Non-Final Rejection) dated Jan. 2, 2024 for U.S. Appl. No. 17/243,279 (pp. 1-14).
Office Action (Notice of Allowance and Fees Due (PTOL-85)) dated Feb. 8, 2024 for U.S. Appl. No. 17/819,523 (pp. 1-7).
Office Action (Notice of Allowance and Fees Due (PTOL-85)) dated Feb. 15, 2024 for U.S. Appl. No. 18/061,979 (pp. 1-8).
Australian Examination Report No. 1 for App. No. AU2022204879, dated Sep. 7, 2023, (1-3 pages).
Office Action (Notice of Allowance and Fees Due (PTOL-85)) dated Oct. 2, 2023 for U.S. Appl. No. 17/347,321 (pp. 1-6).
Office Action dated Sep. 25, 2020 for U.S. Appl. No. 16/264,875 (pp. 1-12).
Office Action dated Nov. 2, 2020 for U.S. Appl. No. 16/586,168 (pp. 1-7).
Notice of Allowance dated Dec. 2, 2020 for U.S. Appl. No. 16/586,246 (pp. 1-10).
Office Action dated Dec. 2, 2020 for U.S. Appl. No. 16/586,356 (pp. 1-7).
Notice of Allowance dated Jan. 7, 2021 for U.S. Appl. No. 16/264,875 (pp. 1-7).
Notice of Allowance dated Feb. 11, 2021 for U.S. Appl. No. 16/586,127 (pp. 1-15).
Notice of Allowance dated Feb. 12, 2021 for U.S. Appl. No. 16/586,168 (pp. 1-5).
International Search Report and Written Opinion for App. No. PCT/US19/53823, dated Jan. 3, 2020, 10 pages.
AU Examination Report for AU Application No. 2018204598, dated Mar. 20, 2019. 5 pages.
Corrected Notice of Allowability dated Apr. 14, 2021 for U.S. Appl. No. 16/586,127 (pp. 1-2).
Notice of Allowance dated Apr. 13, 2021 for U.S. Appl. No. 16/586,356 (pp. 1-5).
Australian Examination Report No. 1 for App. No. AU2020204407, dated Mar. 23, 2021, 4 pages.
Notice of Allowance dated Apr. 29, 2021 for U.S. Appl. No. 16/586,168 (pp. 1-5).
Eddystone format, https://developers.google.com/beacons/eddystone, printed Feb. 3, 2021, 9 pages.
Notice of Allowance dated May 26, 2021 for U.S. Appl. No. 16/586,246 (pp. 1-5).
Office Action (Notice of Allowance and Fees Due (PTOL-85)) dated Sep. 9, 2021 for U.S. Appl. No. 16/947,987 (pp. 1-8).
Office Action (Non-Final Rejection) dated Nov. 10, 2021 for U.S. Appl. No. 16/585,838 (pp. 1-13).
Office Action (Notice of Allowance and Fees Due (PTOL-85)) dated Nov. 22, 2021 for U.S. Appl. No. 17/220,778 (pp. 1-8).
Office Action (Non-Final Rejection) dated Mar. 8, 2022 for U.S. Appl. No. 17/262,178 (pp. 1-9).
Office Action (Notice of Allowance and Fees Due (PTOL-85)) dated Mar. 4, 2022 for U.S. Appl. No. 16/585,838 (pp. 1-7).
Office Action (Notice of Allowance and Fees Due (PTOL-85)) dated May 18, 2022 for U.S. Appl. No. 17/262,178 (pp. 1-7).
Notice of Allowance dated Jun. 24, 2022 for U.S. Appl. No. 29/734,939 (pp. 1-10).
"Shields for Casino Slots" Apr. 28, 2020, ReviewJournal, visited Jun. 7, 2022: https://www.reviewjournal.com/business/(casinos-gaming/las-vegas-firm-creates-safety-shields-for-use-at-casino-slots-tables-2016807/ (Year:2020).
"SuzoHapp" Jan. 14, 2020, Ggrasia, site visited Jun. 7, 2022: https://www.ggrasia.com/ suzohapp-offers-acrylic-dividers-for-gaming-venues/(Year:2020).
"Protective Separators" Oct. 22, 2020, Needs Info Including URL Starting With veb.archive.org/ (Year: 2020).
Stabile, Angelica, "Las Vegas startup creates coronavirus self-cleaning slot machine dividers" May 5, 2020, Fox Business, site visited Jun. 9, 2022: https://www.foxbusiness.com/technology/las-vegas-company-coronavirus-slot-machine-dividers (Year:2020).
Office Action (Notice of Allowance and Fees Due (PTOL-85)) dated Aug. 16, 2022 for U.S. Appl. No. 17/211,521 (pp. 1-8).
Australian Examination Report No. 1 issued in App. No. AU2021202860, dated Jul. 19, 2022, 3 pages.
Office Action (Notice of Allowance and Fees Due (PTOL-85)) dated Sep. 23, 2022 for U.S. Appl. No. 17/262,178 (pp. 1-7).
Office Action (Non-Final Rejection) dated Nov. 8, 2022 for U.S. Appl. No. 17/343,344 (pp. 1-7).
Office Action (Notice of Allowance and Fees Due (PTOL-85)) dated Nov. 16, 2022 for U.S. Appl. No. 17/211,521 (pp. 1-8).
Office Action (Non-Final Rejection) dated Dec. 6, 2022 for U.S. Appl. No. 17/352,049 (pp. 1-8).
Office Action (Non-Final Rejection) dated Dec. 30, 2022 for U.S. Appl. No. 17/351,920 (pp. 1-8).
Office Action (Non-Final Rejection) dated Jan. 17, 2023 for U.S. Appl. No. 17/347,321 (pp. 1-22).
Office Action (Non-Final Rejection) dated Jan. 23, 2023 for U.S. Appl. No. 17/368,393 (pp. 1-6).
Office Action (Notice of Allowance and Fees Due (PTOL-85)) dated Jan. 20, 2023 for U.S. Appl. No. 17/362,486 (pp. 1-8).
Office Action (Notice of Allowance and Fees Due (PTOL-85)) dated Jan. 23, 2023 for U.S. Appl. No. 17/362,530 (pp. 1-9).
Office Action (Notice of Allowance and Fees Due (PTOL-85)) dated Jan. 30, 2023 for U.S. Appl. No. 17/362,486 (pp. 1-2).
Office Action (Notice of Allowance and Fees Due (PTOL-85)) dated Feb. 1, 2023 for U.S. Appl. No. 17/362,530 (pp. 1-2).
Office Action (Non-Final Rejection) dated Feb. 9, 2023 for U.S. Appl. No. 17/674,672 (pp. 1-6).
Office Action (Notice of Allowance and Fees Due (PTOL-85)) dated Feb. 21, 2023 for U.S. Appl. No. 17/351,920 (pp. 1-5).
Office Action (Notice of Allowance and Fees Due (PTOL-85)) dated Mar. 13, 2023 for U.S. Appl. No. 17/343,344 (pp. 1-5).
Office Action (Final Rejection) dated Mar. 17, 2023 for U.S. Appl. No. 17/219,634 (pp. 1-15).
Office Action (Notice of Allowance and Fees Due (PTOL-85)) dated Mar. 27, 2023 for U.S. Appl. No. 17/352,049 (pp. 1-5).
Office Action (Non-Final Rejection) dated Apr. 7, 2023 for U.S. Appl. No. 17/647,568 (pp. 1-6).
Office Action (Non-Final Rejection) dated Apr. 25, 2023 for U.S. Appl. No. 17/491,348 (pp. 1-12).
Office Action (Notice of Allowance and Fees Due (PTOL-85)) dated May 18, 2023 for U.S. Appl. No. 17/368,393 (pp. 1-5).
Office Action (Non-Final Rejection) dated Jun. 4, 2024 for U.S. Appl. No. 18/515,051 (pp. 1-7).
Australian Examination Report No. 1 issued in App. No. AU2019240630, dated Jul. 25, 2024, 5 pages.
Office Action (Notice of Allowance and Fees Due (PTOL-85)) dated Jul. 26, 2024 for U.S. Appl. No. 18/305,063 (pp. 1-8).
Australian Examination Report No. 1 issued in App. No. AU2019240626, dated Jul. 30, 2024, 3 pages.

(56) References Cited

OTHER PUBLICATIONS

Office Action (Notice of Allowance and Fees Due (PTOL-85)) dated Aug. 14, 2024 for U.S. Appl. No. 18/515,051 (pp. 1-8).
Australian Examination Report No. 1 issued in App. No. AU2019240623, dated Sep. 6, 2024, 4 pages.
Australian Examination No. 1 issued in App. No. AU2019240628, dated Sep. 7, 2024, 4 pages.
Office Action (Notice of Allowance and Fees Due (PTOL-85)) dated Sep. 25, 2024 for U.S. Appl. No. 18/515,051 (pp. 1-2).
Office Action (Non-Final Rejection) dated Sep. 30, 2024 for U.S. Appl. No. 18/461,249 (pp. 1-13).
Australian Examination Report No. 1 issued in App. No. AU2023258442, dated Oct. 10, 2024, 3 pages.

\* cited by examiner

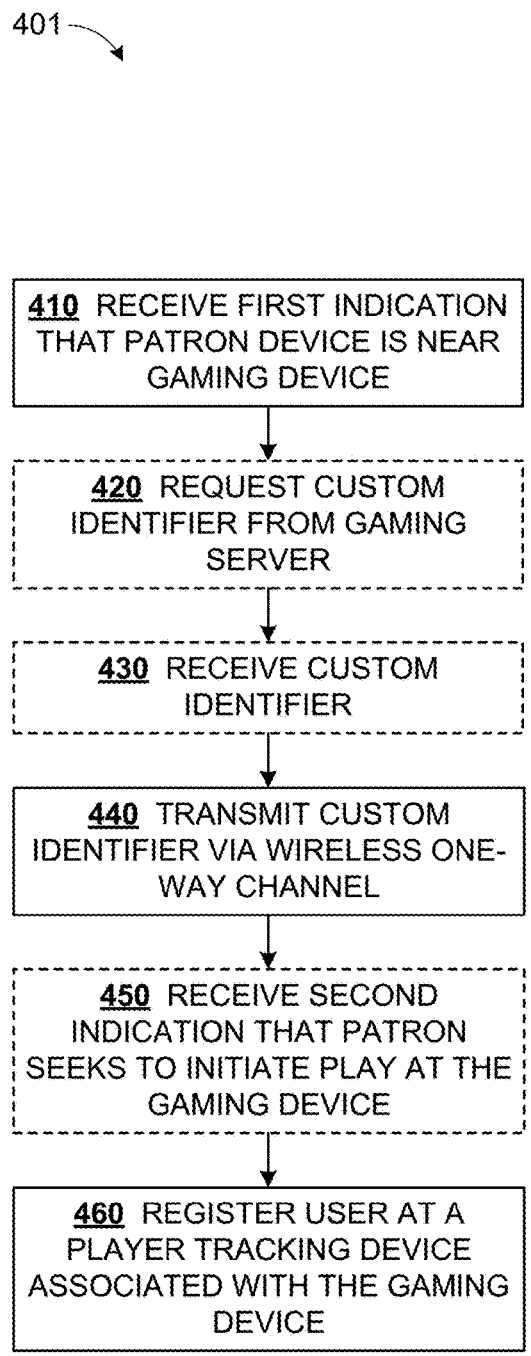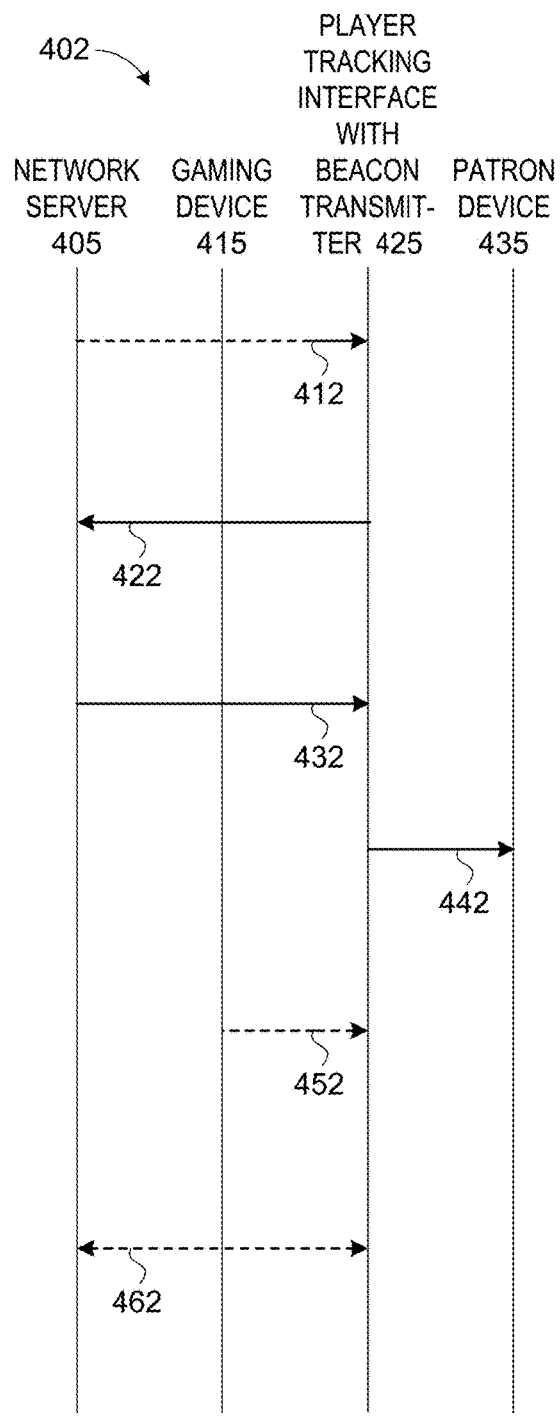
FIG. 4
FIG. 5

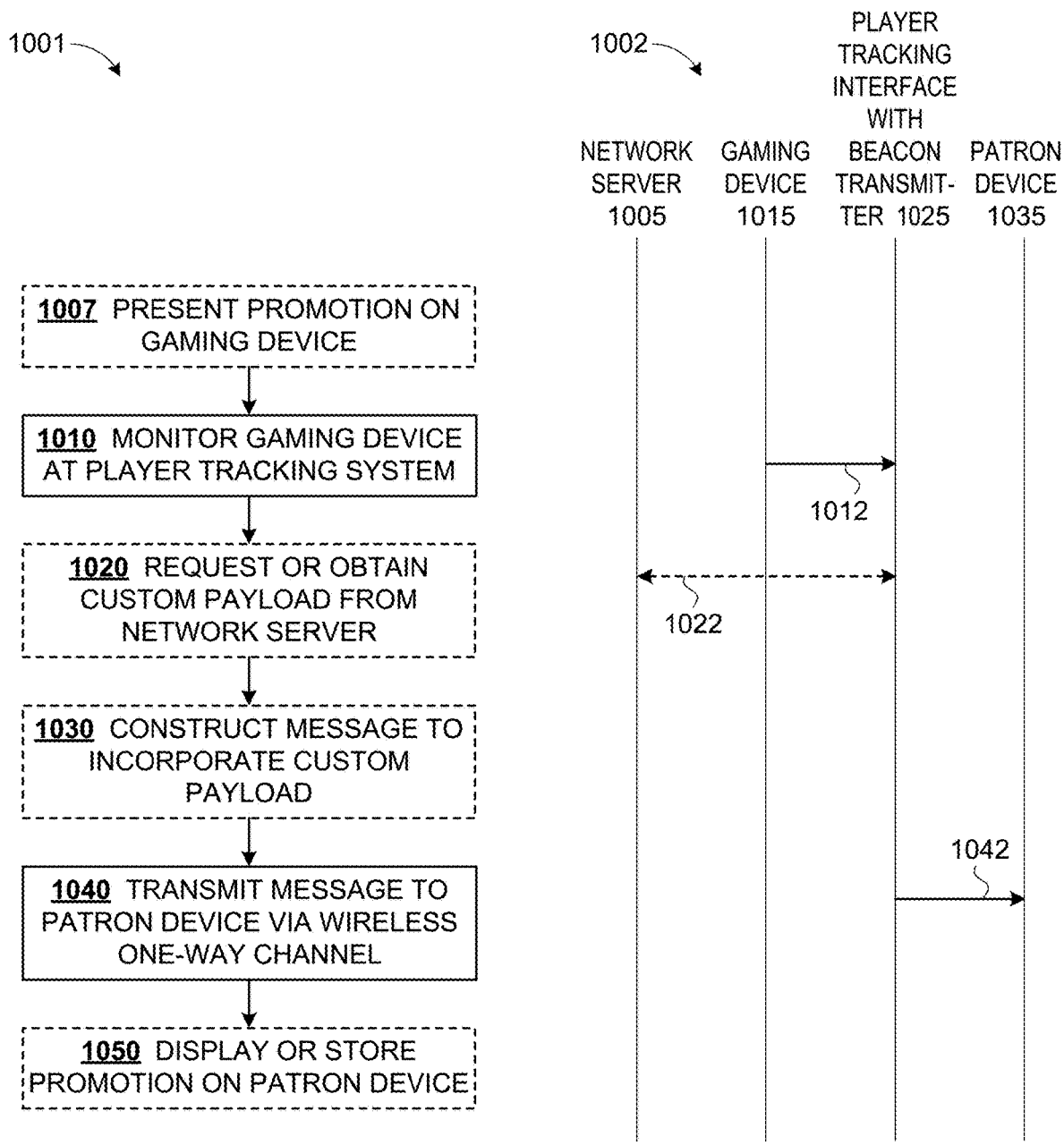

BEACON TO PATRON COMMUNICATIONS FOR ELECTRONIC GAMING DEVICES

CROSS-REFERENCE TO RELATED APPLICATIONS

This application is a continuation of and claims priority to U.S. patent application Ser. No. 18/061,979, filed Dec. 5, 2022, which is a continuation of U.S. patent application Ser. No. 17/211,521, now U.S. Pat. No. 11,544,994, filed Mar. 24, 2021, which claims the benefit of priority to U.S. Provisional Patent Application No. 63/000,994, filed Mar. 27, 2020, all of which are hereby incorporated by reference herein in their entireties.

FIELD

The present disclosure relates to gaming and wagering, and more specifically to applications of wireless communication to one or more patrons.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

In some environments, unique electronically readable cards have been used to identify a player at an electronic gaming device. However, with advances in technology, cards can be replaced with applications ("apps") on a user provided device such as a smartphone. Smartphones commonly incorporate wireless communication capability, which affords additional possibilities for communicating between an electronic gaming environment and a patron. Inasmuch as the full potential of such wireless communication has not been realized, there remains ample opportunity for new or improved technologies to utilize wireless communication technology within an electronic gaming environment.

SUMMARY

In summary, the detailed description is directed to various innovative technologies for applying a one-way wireless communication channel in a casino gaming environment. In some examples, communication on the one-way channel can be utilized to establish a connection with a patron device for play on an electronic gaming device. In other examples, communication on the one-way channel can be triggered by gameplay on the electronic gaming device. In further examples, communication on the one-way channel can lead to patron actions on the electronic gaming device.

In a first aspect, the disclosed technologies can be implemented as a first method. A first indication is received, which indicates that a patron device is near an electronic gaming device. A custom identifier is transmitted via a wireless one-way communication channel. The patron is registered at a player tracking interface associated with the electronic gaming device.

In another aspect, the disclosed technologies can be implemented as a second method. A custom message is received at a patron device via a wireless one-way communication channel, the patron device being near an electronic gaming device. An indication is transmitted, which indicates that a patron associated with the patron device seeks to initiate play at the electronic gaming device.

In a further aspect, the disclosed technologies can be implemented as a third method. A message is transmitted via a wireless one-way communication channel to a patron device from a transmitter near an electronic gaming device. Responsive to the transmitted message, an input is received, which is associated with play on the electronic gaming device.

In one aspect, the disclosed technologies can be implemented by displaying a promotion on an electronic gaming device to a patron associated with a patron device and approaching the electronic gaming device. An indication is received that the patron has accepted the promotion. A custom payload is requested and obtained from a network server. The custom payload is transmitted as a message on a one-way Bluetooth beacon message from a transmitter near the electronic gaming device to the patron device, along with a default identifier of the transmitter. Receipt of the custom payload at the patron device causes the promotion to be stored on the patron device.

In another aspect, the disclosed technologies can be implemented by preparing a message with a payload comprising an indication of a promotion and an identifier of the transmitter. The message is transmitted as a message on a one-way Bluetooth beacon message from a transmitter near the electronic gaming device to the patron device. Receipt of the custom payload at the patron device causes the promotion to be stored on the patron device.

In an additional aspect, the disclosed technologies can be implemented as a fourth method, performed by a player tracking interface near an electronic gaming device. The electronic gaming device is monitored, and, responsive to the monitoring, a message is transmitted to a patron device via a wireless one-way communication channel.

In a particular aspect, the disclosed technologies can be implemented by displaying a promotion on an electronic gaming device to a patron associated with a patron device and playing on the electronic gaming device. An indication is received that the patron has accepted the promotion. A custom payload and a custom identifier are requested and obtained from a network server. A message is transmitted on a one-way Bluetooth beacon message from a transmitter near the electronic gaming device. The message includes the custom payload and the custom identifier, the custom payload being indicative of the promotion and the custom identifier being targeted to the patron device. Receipt of the custom payload at the patron device causes the promotion to be displayed on the patron device.

In a further aspect, the disclosed technologies can be implemented by requesting a custom identifier from a network server, for a patron associated with the patron device and registered for play on the electronic gaming device. The custom identifier is obtained from the network server, and is indicative of a promotion. A message including the custom identifier is transmitted, on a one-way Bluetooth beacon message, from a transmitter near the electronic gaming device to the patron device. Receipt of the custom identifier at the patron device causes the promotion to be displayed on the patron device.

In another aspect, the disclosed technologies can be implemented as a gaming system. The system includes a player tracking interface situated near an electronic gaming device, and an app running on a patron device. The player tracking interface incorporates a transmitter conforming with a one-way wireless communication protocol. The app is configured to handle messages received at the patron device according to the one-way wireless communication protocol.

In another aspect, a system for proximity-based digital interactions is provided. The system includes a beacon transmitter configured to wirelessly broadcast a first interaction prompt message to be read by mobile computing devices near the beacon transmitter. The first interaction prompt message includes a first interaction event code. The system also includes a system server that includes at least one processor configured to execute instructions stored in a memory. The instructions, when executed, cause the processor to at least: receive, from a mobile computing device that has received the first interaction prompt message from the broadcasting of the beacon transmitter, an event activation message that includes the first interaction event code; identify a first pre-programmed action that has been pre-configured to be performed for interaction events presenting the first interaction event code; perform the first pre-programmed action; identify proximity between the mobile computing device and the beacon transmitter based on receipt of the first interaction event code from the mobile computing device; create a second interaction event code that is targeted to be performed by the mobile computing device; and transmit a configuration message to the beacon transmitter based on the identified proximity with the mobile computing device, the configuration message includes the second interaction event code, receipt of the configuration message by the beacon transmitter causes the beacon transmitter to begin broadcasting a second interaction prompt message including the second interaction event code together with the first interaction prompt message, where the first interaction event code is different than the second interaction even code.

In another aspect, an electronic gaming machine is provided. The electronic gaming machine includes a beacon transmitter configured to wirelessly broadcast a first interaction prompt message to be read by mobile computing devices near the beacon transmitter. The first interaction prompt message includes a first interaction event code. The electronic gaming machine also includes a memory storing configuration settings for the beacon transmitter. The electronic gaming machine further includes a processor configured to execute instructions stored in the memory. When executed, the instructions cause the processor to at least: receive a first configuration message including a first interaction event code; configure the beacon transmitter to wirelessly broadcast, in a one-way communication, a first interaction prompt message that includes the first interaction event code, the first interaction event code being associated with a first interaction event that may be activated by one or more mobile computing devices that receive the first interaction prompt message; and receive a second configuration message based on an identified proximity between the electronic gaming machine and a first mobile computing device, the second configuration message includes a second interaction event code, receipt of the second configuration message by the beacon transmitter causes the beacon transmitter to begin broadcasting a second interaction prompt message including the second interaction event code together with the first interaction prompt message, where the first interaction event code is different than the second interaction even code.

In another aspect, a non-transitory computer-readable medium including instructions stored thereon is provided. The instructions, when executed by a processor, cause the processor to at least: receive, from a mobile computing device that has received a first interaction prompt message from a beacon transmitter, an event activation message that includes a first interaction event code; identify a first pre-programmed action that has been pre-configured to be performed for interaction events presenting the first interaction event code; perform the first pre-programmed action; identify proximity between the mobile computing device and the beacon transmitter based on receipt of the first interaction event code from the mobile computing device; create a second interaction event code that is targeted to be performed by the mobile computing device; and transmit a configuration message to the beacon transmitter based on the identified proximity with the mobile computing device, the configuration message includes the second interaction event code, receipt of the configuration message by the beacon transmitter causes the beacon transmitter to begin broadcasting a second interaction prompt message including the second interaction event code together with the first interaction prompt message, where the first interaction event code is different than the second interaction even code.

In another aspect, a system for proximity-based digital interactions is provided. The system includes a beacon transmitter configured to wirelessly broadcast interaction prompt messages to be read by mobile computing devices near the beacon transmitter. The system also includes a system server that includes at least one processor configured to execute instructions stored in a memory. When executed, the instructions cause the processor to at least: transmit a configuration message to the beacon transmitter, the configuration message includes an interaction event code, receipt of the configuration message by the beacon transmitter causes the beacon transmitter to begin broadcasting a first interaction prompt message including the interaction event code; receive, from a mobile computing device that has received the first interaction prompt message from the broadcasting of the beacon transmitter, an event activation message that includes the first interaction event code; identify a pre-programmed action that has been pre-configured to be performed for interaction events presenting the first interaction event code; perform the pre-programmed action; and transmit a completion message to the mobile computing device indicating that the preprogrammed action has been successfully completed.

In another aspect, an electronic gaming machine is provided. The electronic gaming machine includes a beacon transmitter configured to wirelessly broadcast interaction prompt messages to be read by mobile computing devices near the beacon transmitter. The electronic gaming machine also includes a memory storing configuration settings for the beacon transmitter. The electronic gaming machine further includes a processor configured to execute instructions stored in the memory. When executed, the instructions cause the processor to at least: receive a first configuration message including an interaction event code; configure the beacon transmitter to wirelessly broadcast, in a one-way communication, a first interaction prompt message that includes the interaction event code, the interaction event code being associated with an interaction event that may be activated by a mobile computing device that receives the first interaction prompt message; receive a second configuration message that includes an indication to disable the first interaction prompt message; and cancel the wireless broadcasting of the first interaction prompt message.

In another aspect, a non-transitory computer-readable medium including instructions stored thereon is provided. The instructions, when executed by a processor, cause the processor to at least: activate a wireless listening device on a mobile device, the wireless listening device is configured to receive one-way wireless broadcast messages from a beacon transmitter; receive a broadcast transmission from the beacon transmitter, the broadcast transmission includes a first interaction prompt message; parse the first interaction prompt message to identify at least an interaction event code; receive, as input from a patron on a mobile device, an input indicating an activation of the first interaction prompt message; transmit, to a support server, an event activation message that includes at least the interaction event code, wherein the transmittal causes the support server to perform an action associated with the interaction event code.

The foregoing and other objects, features, and advantages of the disclosure will become more apparent from the following detailed description, which proceeds with reference to the accompanying figures.

BRIEF DESCRIPTION OF THE DRAWINGS

FIG. 4 is a flowchart illustrating an example method for registering a patron's device to a gaming device according to the disclosed technologies.

FIG. 5 is a sequence diagram illustrating certain operations of the example method of FIG. 4.

FIG. 10 is a flowchart illustrating a second example method according to the disclosed technologies.

FIG. 11 is a sequence diagram illustrating certain operations of the second example method.

DETAILED DESCRIPTION

Figure 1:
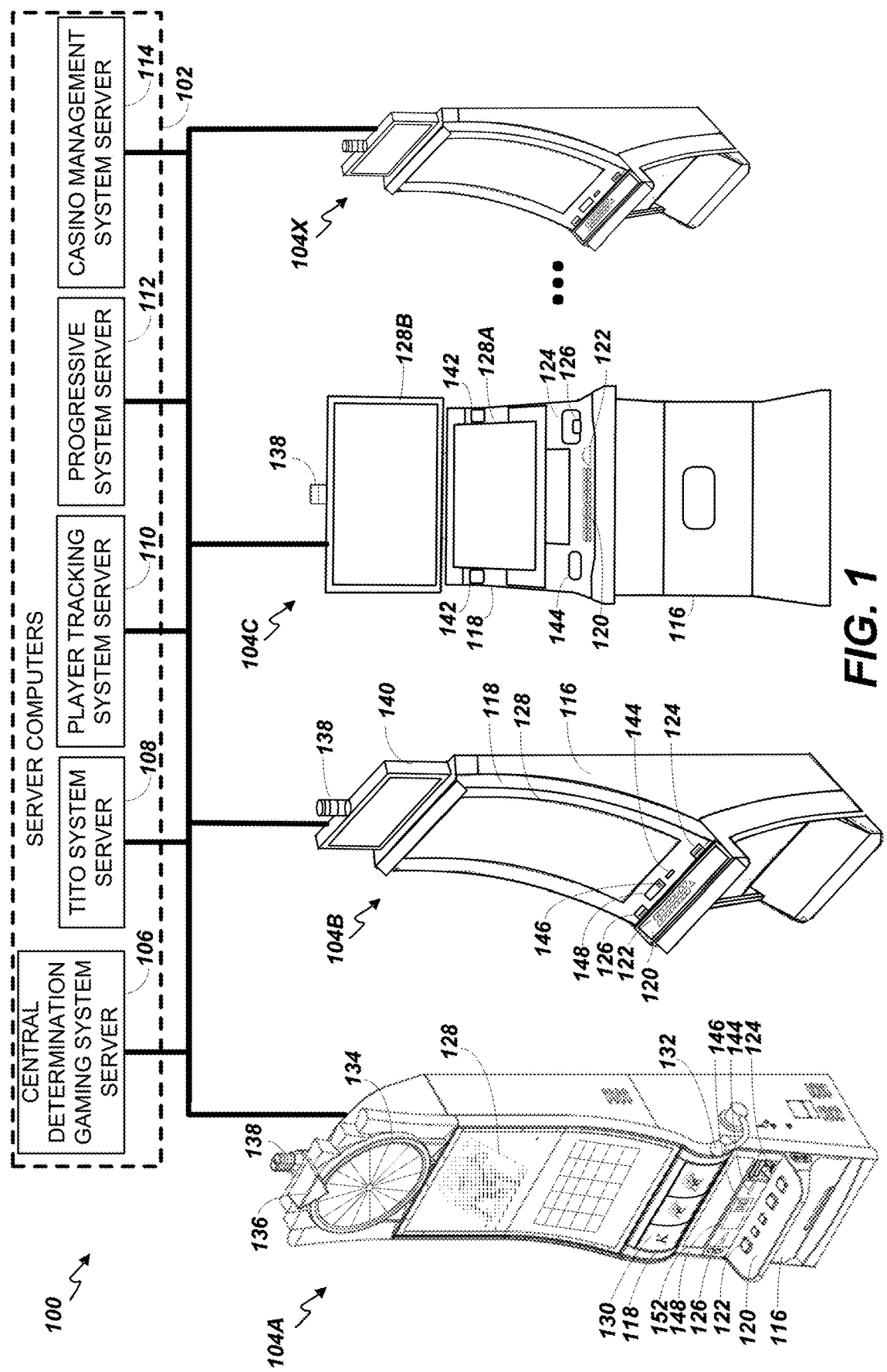
FIG. 1 is an exemplary diagram showing several EGMs networked with various gaming related servers.

Casino operations continue to evolve to provide better user experience. One area of development is use of smartphone or touchscreen interfaces on patron's personal devices which have become ubiquitous and intuitive for many patrons. However, full wireless communication in crowded spaces with many gaming devices and many patrons can rapidly congest available wireless resources and can also lead to rapid battery depletion, which patrons can be sensitive to. Additionally, due to security concerns, casino operators and gaming regulators can be reluctant to allow patron's personal devices to communicate information to an EGM.

The advent of one-way wireless technologies, sometimes referred to as beacons, within widely deployed technologies such as Bluetooth® can significantly alleviate a number of problems with casino wireless deployments and can provide additional opportunities for improving the user experience. Bluetooth® beacons are inherently low-power, low-range transmissions for which the transmission power can be controlled so that a reception range of a few meters (m) can be achieved, and interference between beacons in a crowded casino environment can be minimized. Additionally, protocols for one-way beacon transmissions are considerably simpler than those associated with bidirectional messaging. Particularly, such protocols are free of handshakes and do not require a receiving user device to enable a power-consuming Bluetooth® transmitter at any time. A Bluetooth® beacon is also not restricted to e.g. a maximum number of receiving devices as with paired Bluetooth® networks, and can be broadcast to a large number of devices within range.

Thus, one-way beacons can improve the local communication process between an electronic gaming device and a nearby patron, as patrons come and go, pass through a casino, start play, or move on to another gaming device. Different aspects of the disclosed technologies can be implemented on the side of the electronic gaming device (in some examples, including a beacon transmitter in an associated player tracking interface) and on the side of the patron's personal device and installed app. Additional use cases of the disclosed technology are beacon-to-game, where a beacon transmission leads to a gameplay event, and game-to-beacon, where gameplay leads to a beacon transmission. In all of these use cases, similar advantages can be realized through the localized communication range, low power consumption, and lightweight protocol. One-way beacon communication can be complementary to other wireless technologies and can be used alongside cellular telephony, Wi-Fi, and NFC, each fulfilling different sets of requirements. For example, Bluetooth® is operable at a significantly greater range, commonly around 10 m, as compared to NFC, commonly around 10 cm.

The casino environment offers numerous opportunities to advantageously deploy one-way beacon messages. Beacon messages can be formatted in various ways for different applications. Beacon transmitters can employ a default identifier so that the beacon messages can be received by any patron device in the vicinity of the transmitter. Alternatively, a custom identifier can be used so that only a particular patron device (for example, a patron registered on and playing a particular gaming device) can recognize a payload of the beacon message. Separate from the identifier, beacon messages can include a promotion, which can be specific to a particular gaming device near or associated with the beacon transmitter, specific to another gaming device, or can be for a non-gaming activity. Beacon messages can be used to propagate a promotion to a patron device. For example, a patron may accept a prompt presented on a screen of a gaming device. The beacon message can be used to propagate the same promotion to the patron device, where it can be stored persistently, even after the patron has departed from the gaming device. To illustrate, a coupon or voucher having a predetermined validity (or, with no expiration date) can be stored on the patron device for future redemption. In other examples, the message propagated to the patron device can be transient, and valid only as long as it is displayed on the patron device. To illustrate, the promotion can be for immediate credit on the gaming device, or for immediate reservation for a future event. The beacon message can be used in conjunction with other communication or location finding technologies. As an example, the beacon can be customized to a patron device of a passing patron based on other messages being used to identify which patron device is in proximity to a beacon transmitter. As another example, the promotion can be accepted on the patron device, and indication of the acceptance can be transmitted by Wi-Fi to a network server, or by NFC directly to a gaming device or linked player tracking interface, e.g., by presenting the patron device to the gaming device or player tracking interface.

The usage and meaning of all quoted terms in this section applies throughout this disclosure unless clearly indicated otherwise or repugnant to the context. The terminology below extends to related word forms.

The term "app" refers to a software application installed on a patron device. The app can be preinstalled on the device, or can be installed by a user of the device. Some examples of apps are user experience apps associated with and intended for use within a particular casino or family of casinos. An example app may be, for example, a Mobile nCompass app provided by Aristocrat® Technologies, Inc. Some apps may support all or part of the disclosed technologies. Some apps may allow parts of the disclosed technologies to be selectively disabled or enabled.

The term "application" or "program" refers to software, such as an operating system, device drivers, and/or appropriate user-mode instructions to provide functionality. The software can be stored in an associated memory device (which is an example of a computer-readable medium). The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions for implementation of the processes of various embodiments. Thus, embodiments are not limited to any specific combination of hardware and software.

The term "one-way beacon" refers to a one-way communication message transmitted from a "beacon transmitter." Some example one-way beacons described herein transmit wireless messages carrying an identifier, message, or other data. Some example beacons conform with the Bluetooth® 4.0 Low Energy standard, whereby the beacon transmitter does not have Bluetooth® listener capability, and a corresponding receiving device need not turn on any Bluetooth® transmitter. That is, a conforming one-way beacon, as configured, does not necessarily require or support Bluetooth® pairing between transmitting and receiving devices. The one-way beacon transmitters described herein are operated as transmit-only devices; neither the beacon device nor gaming device or a player tracking interface (to which it may be mounted) receives communication over the same wireless channel or protocol at any time, whether during or after registration, whether during or after transmission of a message, or whether during or after transmission of any other message. Any communication in a direction opposite to the channel can be provided by alternate techniques, e.g., a patron pressing a button, or by indirect link such as Wi-Fi from a patron device to a network server, and thence to a gaming device or player tracking interface. Some one-way beacons can be transmitted continuously, while other beacons can be transmitted periodically or intermittently, and further some beacons can begin transmitting in response to an external trigger. An example beacon transmitter may be, for example, a RadBeacon USB transmitter manufactured by Radius Networks, Inc. A beacon's transmit power can be controlled to provide a limited range of about 5 m, or about 1-3 m. Beacon messages transmitted herein can include default or custom identifiers and default or custom payloads. Custom identifiers or payloads can be transmitted over a short time window of about one minute (or, within a range from 10 s to 10 minutes). At the expiration of the time window, the beacon transmitter can revert to a default identifier or default payload. In further examples, a beacon transmitter can be placed in standby.

The term "computer-readable medium" refers to any statutory medium (e.g., non-transitory medium) that participates in providing data (e.g., instructions) that may be read by a computer, a processor, or a like device. Such a medium may take many forms, including but not limited to non-volatile media, volatile media, and specific statutory types of transmission media. Non-volatile media include, for example, optical or magnetic disks and other persistent memory. Volatile media include dynamic random access memory ("DRAM"), which typically constitutes main memory. Statutory types of transmission media include coaxial cables, copper wire, and fiber optics, including the wires that comprise a system bus coupled to the processor. Common forms of computer-readable media include, for example, a solid state drive, a flash drive, a secure digital ("SD") card, a compact flash ("CF") card, a floppy disk, a flexible disk, hard disk, magnetic tape, any other magnetic medium, a CD-ROM, Digital Versatile Disc ("DVD"), any other optical medium, punch cards, paper tape, any other physical medium with patterns of holes, RAM, programmable read-only memory ("PROM"), erasable programmable read-only memory ("EPROM"), electrically erasable programmable read-only memory ("EEPROM"), flash memory, a USB memory stick, a dongle, any other memory chip or cartridge, an RFID device, or any other medium from which a computer can read. The terms "computer-readable memory" and/or "tangible media" specifically exclude signals, waves, and wave forms or other intangible or transitory media that may nevertheless be readable by a computer. The term "carrier wave" may refer to an electromagnetic wave modulated in amplitude, frequency, or phase to convey a signal. Various forms of computer-readable media may be involved in carrying sequences of instructions to a processor. For example, sequences of instruction (i) may be delivered from a random access memory ("RAM") to a processor, (ii) may be carried over a wireless transmission medium, and/or (iii) may be formatted according to numerous formats, standards, or protocols.

The term "credit" refers to a balance in a patron's account at a casino or on an electronic gaming device. The credit can be in a form redeemable for hard currency, or in another form, such as loyalty points, achievements, or other collectables. Credit can be increased or diminished through gameplay. Credit can be awarded as a promotion independent of specific winning plays. In some examples, credit can be exchanged for cash funds or other services (e.g. restaurant meals or show tickets).

The term "game" refers to a gambling event with a beginning and end that may encompass one or more spins, handle pulls, or spans of time. The end of the game may be determined voluntarily (in which a player elects to stop play) or involuntarily (in which the electronic gaming device terminates play). In some examples, a game may include non-gambling events such as pachinko games, skill-based games, non-RTP-based games, bonus games, or the like. The term "primary game" or "base game" may refer to play resulting from the spinning of standard physical or virtual (e.g., electronic, video, or graphical) slot reels, the dealing of physical or virtual (e.g., electronic, video, or graphical) cards, or other game outcomes. For example, the outcome of a primary reel game might be cherry-cherry-bar. The term "primary reel game" or "base reel game" may refer to play resulting from the spinning of standard physical or virtual slot reels. The terms "bonus game," "bonus feature," "feature game," or "secondary game" may refer to an additional game playable on an electronic gaming device that is separate from the primary game. A bonus game typically does not require the player to wager any additional funds or credits, and a bonus game may include the possibility of winning a relatively large payout. In some cases, a bonus game may require an additional wager.

The term "game controller" refers to a circuit (e.g., an electronic circuit board, a programmable computer chip, an integrated circuit ("IC"), etc.) within an electronic gaming device that includes one or more processors that process game play instructions in accordance with game play rules, and outputs or generates game play outcomes to one or more displays, screens, or monitors. For example, a game controller can process game play instructions, and generate outcomes. The game play rules may be stored as program code in a memory (for execution by one or more processors of the game controller) but can also be hardwired in a dedicated circuit. In some embodiments, the memory may also store data indicative of a plurality of symbols, pay tables, reel strip layouts, images, and/or other information to be used in games. The term "control logic" may refer to a game controller or, more generally, one or more processors, operable to process game play instructions in accordance with game play rules, determine outcomes in accordance with game play rules, and generate outputs (e.g., to one or more display screens and/or speakers). For example, control logic can implement game play instructions, determine outcomes, and generate outputs. Depending on implementation, control logic can be implemented by software executable on a CPU, by software controlling special-purpose hardware (e.g., a GPU or other graphics hardware for video acceleration), or by special-purpose hardware (e.g., in an ASIC).

The term "gaming device" refers to any electrical, mechanical, or electro-mechanical device, including an electronic gaming machine ("EGM"), that may accept wagers, step through a process to determine an outcome, and pay winnings based on the outcome. In some examples, the outcome may be randomly generated, as with a typical slot machine; may be generated through a combination of randomness and player skill, as with video poker; or may be generated entirely through player skill. Gaming devices may include slot machines (with virtual and/or mechanical reels), video poker machines, video blackjack machines, video roulette machines, keno machines, video bingo machines, pachinko machines, lottery terminals, handheld gaming devices, and the like. In some embodiments, handheld gaming devices may include smartphones, tablets, and other portable devices. Thus, an electronic gaming device may use specially-configured computer hardware that implements game functionality, or an electronic gaming device may use general-purpose computer hardware that has been programmed to implement game functionality.

The term "mobile device" refers to a battery-powered or untethered portable computing device. Some mobile devices can include wireless communication capability. A mobile device can be a smartphone, however this is not a requirement.

The term "network server" refers to any server that is part of a casino management system or network in a casino, that facilitates communication or connection between a patron device and an electronic gaming device or associated player tracking interface. A network server is a resource serving more than one gaming device and is distinct from the electronic gaming devices and player tracking interfaces themselves. A network server can provide or maintain history or profiles of patrons of the casino. A network server can be a single computer or can be distributed over multiple connected computers in one or more locations. Accordingly, multiple actions ascribed to a network server herein can sometimes be performed by distinct computers.

The term "peripheral device" refers to a device operatively connected (e.g., physically, wirelessly, and/or logically) to an electronic gaming device (e.g., more specifically to a game controller within an electronic gaming device) that is configured to assist in the operation of game, play, payout, wager and/or player tracking related functions. In some embodiments peripheral devices may be located near players at a table game. A beacon transmitter can be a peripheral device.

The term "player tracking interface" refers to a device or combination of devices that can be an adjunct or accessory to an electronic gaming device, and can include a wireless beacon transmitter. A player tracking interface can monitor events or communications of the electronic gaming device and can cause a registered patron's account or profile to be updated accordingly. A player tracking interface can communicate with one or more casino management servers of a casino management system. A player tracking interface may be, for example, an nCompass™ device manufactured by Aristocrat® Technologies, Inc. In some examples, an "intelligent player tracking interface" can download the patron's profile or history from the casino management system, perform updates locally, and subsequently provide updated profile or history to the casino management system. In other examples, a "thin player tracking interface" can relay gameplay events to the casino management system, so that the player's profile or history is actively maintained on the casino management servers. In some examples, a player tracking interface can be installed within or directly on an electronic gaming device, and each gaming device can have its own player tracking interface. In other examples, the player tracking interface can be integrated as part of a gaming device, an discrete apparatus attached to or installed within a gaming device, or a separate device apart from one or more associated gaming devices. A multi-player gaming device can have one multi-player player tracking interface, or independent player tracking interfaces for each player position. In other examples, multiple gaming devices (for example, in a proximate cluster of gaming devices) can share a single player tracking interface which can concurrently support all of the electronic gaming devices.

The term "processor" when described as part of, or existing within, a game controller, refers generically to any hardware device that can process game play instructions in accordance with game play rules and may include: a microprocessor, microcontroller, programmable logic device, digital signal processors, graphics processors, and/or other computational device, a general-purpose computer (e.g., a PC), or a server. That is, a processor may be provided by any suitable logic circuitry for receiving inputs, processing the inputs in accordance with instructions stored in memory and generating outputs (for example, on the display). For example, a processor can process game play instructions, and generate outcomes. Such processors may also be referred to as central processing units ("CPUs"). Most processors are general-purpose units, however, it is also known to provide a specific-purpose processor using, for example, an application-specific integrated circuit ("ASIC") or a field-programmable gate array ("FPGA"). Exemplary processors include the INTEL® CORE™, the AMD® RYZEN™, and the ARM® CORTEX® processors.

The term "product" means any machine, manufacture and/or composition of matter as contemplated by 35 U.S.C. § 101, unless expressly specified otherwise.

The term "promotion" refers to a message or other indication of a product, service, credit, or benefit (collectively, "promoted items") made available to a patron of a casino. The promotion can indicate a promoted item that is available to the patron under more favorable terms than the normal or published terms for that item. For example, a promotion could offer the item for free instead of for its normal charge, or at a discount. A promotion can offer an item not usually available, such as by providing an unlock code for a special game feature. A promotion can be restricted for a particular time period, which can be immediately following the time at which the promotion is issued, or after a delay (e.g. next day). Some promotions may require the patron to act (e.g., by visiting a particular restaurant or gaming machine), while other promoted items may be provided automatically (e.g., by credit to the patron's account).

The terms "proximity," "near," and similar words can vary between examples, according to particular usage, or according to a communication technology in use. In some examples a patron device and an electronic gaming device can be proximate if the distance between them is less than 10 centimeters (cm), less than 30 cm, less than 0.5 m, less than 1 m, less than 3 m, or less than 10 m. A beacon from a beacon transmitter to a patron device can be operable when the patron device is within 0.5 m, 1 m, 3 m, 5 m, or 10 m of the electronic gaming device, and in this context, "near" can mean within 0.5 m to within 10 m. NFC communication between a patron device and an electronic gaming device can be operable when the patron device is within 10 cm or up to 30 cm of the electronic gaming device, and in this context, "near" can mean within 10 cm to within 30 cm accordingly. A player tracking interface can be proximate to an electronic gaming device if the player tracking interface is less than less than 50 cm, less than 30 cm, less than 10 cm, or even inside the electronic gaming device. Proximity between a beacon transmitter and a receiving device may be established when the receiving device is able to reliably receive transmission data from the beacon transmitter (e.g., without uncorrectable data loss).

The term "register" refers to a process or action of forming a logical connection between two entities. For example, a patron can be registered for play on an electronic gaming device, whereby a player tracking interface can associate gameplay with the registered patron.

FIG. 1 illustrates several different models of EGMs which may be networked to various gaming related servers. The present embodiments can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present embodiments may be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

Figure 2A:
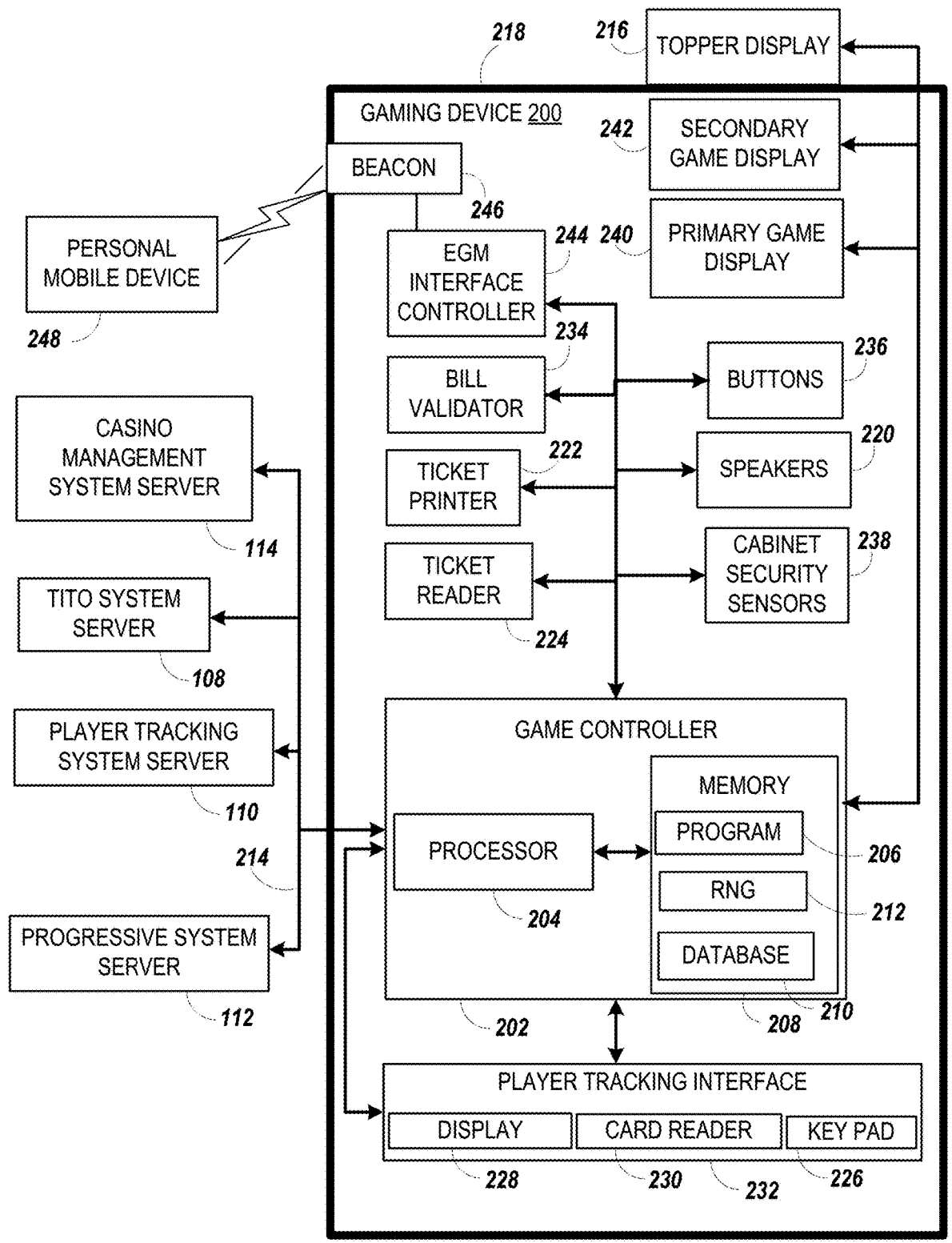
FIG. 2A is a block diagram of an exemplary EGM.

FIG. 2A is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (e.g., a play or round of the game) may be generated on a remote gaming device such as a central determination gaming system server 106 (not shown in FIG. 2A but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108.

The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

While an example gaming device 200 has been described in regard to FIG. 2A, certain aspects of the present disclosure may be implemented by gaming devices that lack one or more of the above-described components. For example, not all gaming devices suitable for implementing aspects of the present disclosure necessarily include top boxes, information panels, cashless ticket systems, and/or player tracking systems. Further, some suitable gaming devices may include a single game display having mechanical reels or a video display. Moreover, other embodiments may be designed for bar tables and have displays that face upwards.

Many different types of wagering games, including mechanical slot games, video slot games, video poker, video black jack, video pachinko, keno, bingo, and lottery, may be provided by the gaming device 200. In particular, the gaming device 200 may be operable to provide many different instances of games of chance. The instances may be differentiated according to themes, sounds, graphics, type of game (e.g., slot game vs. card game vs. game with aspects of skill), denomination, number of paylines, maximum jackpot, progressive or non-progressive, bonus games, class 2 or class 3, etc.

The gaming device 200 may allow a player to select a game of chance, skill, or combination thereof, to play from a plurality of instances available on the gaming device 200. For example, the gaming device 200 may provide a menu with a list of the instances of games that are available for play on the gaming device 200 and a player may be able to select, from the list, a game that they wish to play.

In the example embodiment, the gaming device 200 also includes an EGM interface controller 244 and a wireless beacon 246 configured to transmit wireless data to, or otherwise establish wireless communication with, nearby personal mobile devices (or "mobile devices") 248 of players. In some embodiments, the beacon 246 may utilize near-field communication (NFC) or Bluetooth® to pair with the mobile device 248. In one example embodiment, the gaming device 200 uses a Bluetooth beacon such as those made commercially available by Radius Networks, Inc. (headquartered in Washington, D.C.) (e.g., "RadBeacon USB"). The beacon 246 is able to be configured, by the EGM interface controller 244, with a changeable beacon ID that is used when establishing connectivity between the beacon 246 and the mobile device 248. During operation, in some embodiments, the beacon 246 may detect that there is a mobile device 248 nearby and available for a wireless connection. Upon detection of the nearby mobile device 248, the EGM interface controller 244 may transmit a beacon ID request to the casino management system server 114. The casino management system server 114 generates a new ID ("custom beacon ID") for the beacon 246 and transmits that beacon ID back to the gaming device 200. The custom beacon ID may be uniquely generated (e.g., relative to other beacon IDs being used in other EGMs at the casino's property), and may use output from an RNG to generate the beacon ID. The EGM interface controller 244 reconfigures the beacon 246 to use the custom beacon ID. Once the custom beacon ID is configured, the beacon 246 establishes a pairing with the mobile device 248, thereby allowing wireless connectivity between the mobile device 248 of the player and allowing the various functionality permitted by the gaming device 200 or other networked services to be made available to the mobile device 248 on the network 214. In some embodiments, the beacon 246 may be configured as a one-way beacon (e.g., transmission only), thereby allowing transmission of messages from the one-way beacon to nearby mobile device 248 or other receptive computing devices.

Figure 2B:
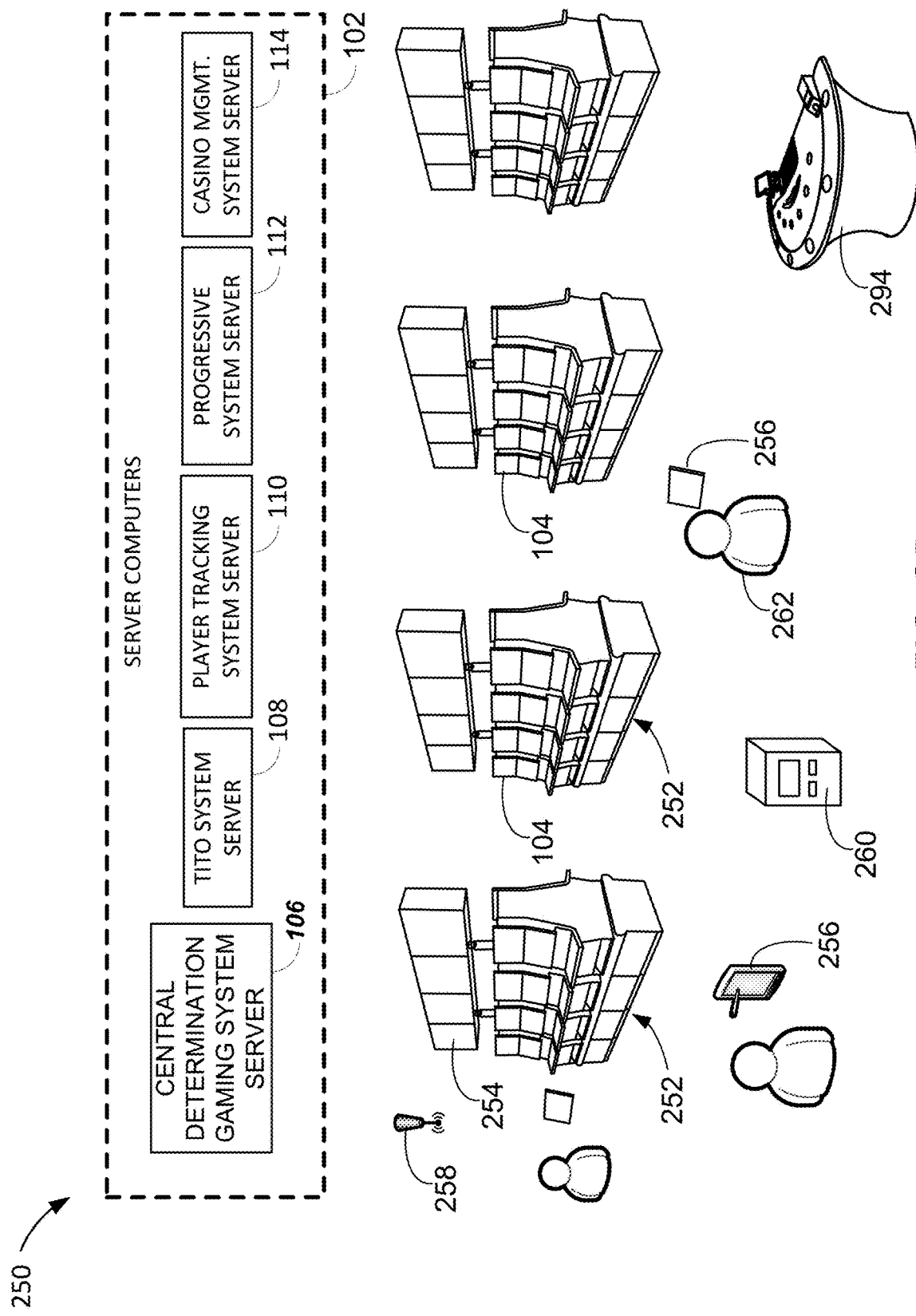
FIG. 2B illustrates an example gaming environment in which the gaming devices shown in FIGS. 1 and 2A may appear.

FIG. 2B illustrates an example gaming environment 250 in which the gaming devices 104, 200 shown in FIGS. 1 and 2A may appear. In the example embodiment, the gaming environment 250 is a physical venue of a casino that includes banks 252 of gaming devices 104. In this example, each bank 252 of gaming devices 104 includes a corresponding gaming signage system 254. In this example, the gaming environment 250 includes a gaming table (e.g., a "smart table") 294 that is configured for table gaming. The gaming environment 250 also includes mobile gaming devices 256 which, in various embodiments, may present wagering games or social games. The mobile gaming devices 256 may, for example, include tablet devices, cellular phones, smart phones, personal mobile devices 248, or other handheld computing devices. In this example, the mobile gaming devices 256 are configured for communication with one or more other devices in the gaming environment 250, including but not limited to one or more of the gaming devices 104, one or more smart tables 294, one or more kiosk(s) 260, and one or more of the server computers 102, via wireless access points 258. In some implementations, the mobile gaming devices 256 may be configured for communication with one or more other devices in the gaming environment 250, including but not limited to one or more of the gaming devices 104, one or more smart tables 294, one or more kiosk(s) 260, via wireless communications (e.g., near-field communication (NFC), Bluetooth, Wi-Fi, or such, via one of the "beacons" described herein).

According to some examples, the mobile gaming devices 256 may be configured for stand-alone determination of game outcomes. However, in some alternative implementations the mobile gaming devices 256 may be configured to receive game outcomes from another device, such as a central determination gaming system server (not separately shown), one of the gaming devices 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some embodiments, the gaming environment 250 may include one or more kiosks 260 that are configured to facilitate monetary transactions involving the mobile gaming devices 256, which may include cash out and/or cash in transactions. The kiosk(s) 260 may be configured for wired and/or wireless communication with the mobile gaming devices 256. The kiosk(s) 260 may be configured to accept monetary credits from casino patrons 262 or to dispense monetary credits to casino patrons 262 via cash, a credit or debit card, via a wireless interface (e.g., via a wireless payment app), via tickets, digital wallet, or such. According to some examples, the kiosk(s) 260 may be configured to accept monetary credits from a casino patron and to provide a corresponding amount of monetary credits to a mobile gaming device 256 for wagering purposes (e.g., via a wireless link such as an NFC link) In some such examples, when a casino patron 262 is ready to cash out, the casino patron 262 may select a cash out option provided by the mobile gaming device 256, which may include a real button or a virtual button (e.g., a button provided via a graphical user interface) in some instances. In some such examples, the mobile gaming device 256 may send a "cash out" message to the kiosk 260 via a wireless link in response to receiving a "cash out" indication from a casino patron. The kiosk 260 may provide monetary credits to the patron 262 corresponding to the "cash out" message, which may be in the form of cash, a credit ticket, a credit transmitted to a financial account corresponding to the casino patron, a digital wallet account, or such.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as within a casino gaming area (e.g., based on GPS and geofencing).

Figure 2C:
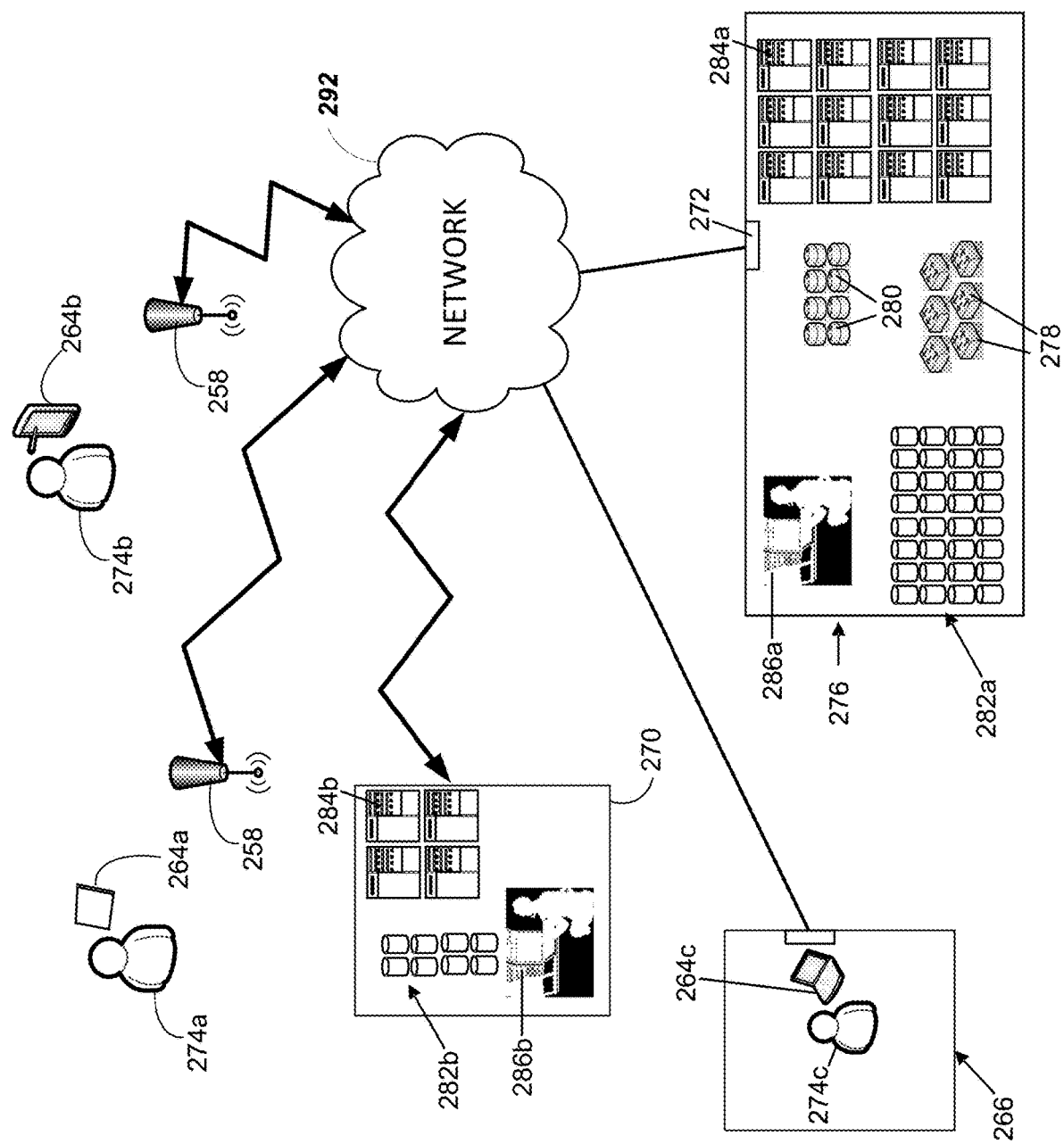
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In the example embodiment, various gaming devices, including but not limited to end user devices (EUDs) 264a, 264b and 264c are capable of communication via one or more networks 292. The networks 292 may, for example, include one or more cellular telephone networks, the Internet, Wi-Fi networks, satellite networks, or such. In this example, the EUDs 264a and 264b are mobile devices. For example, the EUD 264a may be a tablet device and the EUD 264b may be a smart phone. EUDs 264 may be similar to personal mobile device 248 (shown in FIG. 2A) or mobile gaming devices 256 (shown in FIG. 2B). The EUD 264c is a laptop computer that is located within a residence 266 at the time depicted in FIG. 2C. Accordingly, in this example the hardware of EUDs 264 is not specifically configured for online gaming, although each EUD 264 is configured with software for online gaming. For example, each EUD 264 may be configured with a web browser, installed gaming applications, player apps, or such. Other implementations may include other types of EUD 264, some of which may be specifically configured for online gaming.

In this example, a gaming data center 276 includes various devices that are configured to provide online wagering games or social games via the networks 292. The gaming data center 276 is capable of communication with the networks 292 via the gateway 272. In this example, switches 278 and routers 280 are configured to provide network connectivity for devices of the gaming data center 276, including storage devices 282a, servers 284a and one or more workstations 286a. The servers 284a may, for example, be configured to provide access to a library of games for online game play or for download and installation by remote devices (e.g., EUDs 264). In some examples, code for executing at least some of the games may initially be stored on one or more of the storage devices 282a. The code may be subsequently loaded onto a server 284a after selection by a player via an EUD 264 and communication of that selection from the EUD 264 via the networks 292. The server 284a onto which code for the selected game has been loaded may provide the game according to selections made by a player and indicated via the player's EUD 264. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 292. Here, the financial institution data center 270 includes servers 284b, storage devices 282b, and one or more workstations 286b. According to this example, the financial institution data center 270 is configured to maintain financial accounts, such as checking accounts, savings accounts, loan accounts, payment card accounts, rewards accounts, loyalty accounts, player accounts, digital wallet accounts, or such. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost, or various social games, some of which may use virtual currencies. According to some such implementations, one or more of the servers 284a may be configured to monitor player credit balances, which may be expressed in game credits, in real or virtual currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some embodiments, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

In some embodiments, the financial institution data center 270 may be configured for communication with one or more devices in the gaming environment 250. As noted above, the mobile gaming devices 256 may or may not be specialized gaming devices, depending on the particular implementation. In some examples, the mobile gaming devices 256 may be end user devices (EUDs 264), such as tablet devices, cellular phones, smart phones and/or other handheld devices.

In some embodiments, the gaming environment 250 may include one or more kiosks 260. According to some implementations, the kiosk(s) 260 may be part of the digital wallet management server 290 even though in FIG. 2B the kiosk(s) 260 and the digital wallet management server 290 are shown separately. The kiosk(s) 260 may be configured for communication with other devices of the digital wallet management server 290 (e.g., with one or more servers of the digital wallet management server 290), for example, to allow digital wallet-based transactions at the kiosk 260 (e.g., purchasing credits from a digital wallet account to cash or to a TITO ticket, redeeming a TITO ticket to a digital wallet account, redeeming a reward stored in a digital wallet).

In some embodiments, the kiosk(s) 260 may be configured to facilitate monetary transactions involving a digital wallet (e.g., monetary transactions involving digital wallet software being executed by one or more of the mobile gaming devices 256). Such transactions may include, but are not limited to, cash out and/or cash in transactions. The kiosk(s) 260 may be configured for wired and/or wireless communication with the mobile gaming devices 256. The kiosk(s) 260 may be configured to accept monetary credits from casino patrons 262 and/or to dispense monetary credits to casino patrons 262 via cash, a credit or debit card, via a wireless interface (e.g., via a wireless payment app), via tickets, etc. Accordingly, in some such examples, the kiosk(s) 260 may be configured for communication with one or more financial institution data centers.

In some embodiments, the kiosk(s) 260 may be configured to accept monetary credits from a casino patron and to provide a corresponding amount of monetary credits to a mobile gaming device 256 for wagering purposes (e.g., via a wireless link such as a near-field communications link) According to some implementations, a digital wallet app running on one of the mobile gaming devices 256 (e.g., on a patron's cell phone) may be configured for wireless communication with gaming devices 104, smart tables 294, or such (e.g., to provide digital wallet-based, cashless "cash-out" and/or "cash-in" transactions at location). In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" message to a kiosk 260 via a wireless link in response to receiving a "cash out" indication from a casino patron. The kiosk 260 may provide monetary credits to the patron 262 corresponding to the "cash out" message, which may be in the form of cash, a credit ticket, a credit transmitted to a financial account corresponding to the casino patron, etc.

In some examples, at least some of the mobile gaming devices 256 may be configured for implementing digital wallet transactions with a gaming device 104 or a smart table 294 via Bluetooth or NFC. According to some implementations, the gaming device 104 or smart table 294 may be configured to provide a Bluetooth low-energy (LE) beacon for establishing wireless communication with at least some of the mobile gaming devices 256. In some implementations, the mobile gaming device 256 may implement digital wallet transactions (such as cash in or cash out transactions) with the gaming device 104 or smart table 294 directly, via NFC or Bluetooth. In other implementations, the gaming device 104 or smart table 294 may be able to transmit communications to a mobile gaming device via NFC or the Bluetooth (LE) beacon, but the mobile gaming device may be required to provide input to the gaming device 104 or smart table 294 indirectly (e.g., via one or more devices of a player loyalty system or of a digital wallet management system).

Some embodiments provide alternative methods of establishing a "cardless" connection between a mobile gaming device and an EGM 104 or a smart table 294. In some such implementations, a player tracking interface of the gaming device 104 or smart table 294 may be configured to establish a wireless connection and a cardless player tracking session with a mobile gaming device. For example, the gaming device 104 may be configured to establish a wireless connection and a cardless player tracking session with a mobile gaming device via the player tracking interface 232 that is described above with reference to FIG. 2A. A smart table 294 may be configured to establish a wireless connection and a cardless player tracking session with a mobile gaming device.

In some examples, a player tracking interface of the gaming device 104 or smart table 294 may be configured for wireless communication with a mobile gaming device (e.g., via Bluetooth or NFC). In some such examples, the player tracking interface may include a user interface (e.g., a GUI or a physical button) with which a player can interact in order to obtain a passcode from the player tracking interface. The passcode may, for example, be an RNG code. The passcode may be provided to the player via a display of the player tracking interface. The player may be required to input the code (e.g., via the mobile gaming device) in order to pair the mobile gaming device with the player tracking interface and enable digital wallet transactions with the EGM or the smart table. According to some such implementations, a "cardless" player loyalty session may also be established when the mobile gaming device is paired with the player tracking interface.

Figure 3:
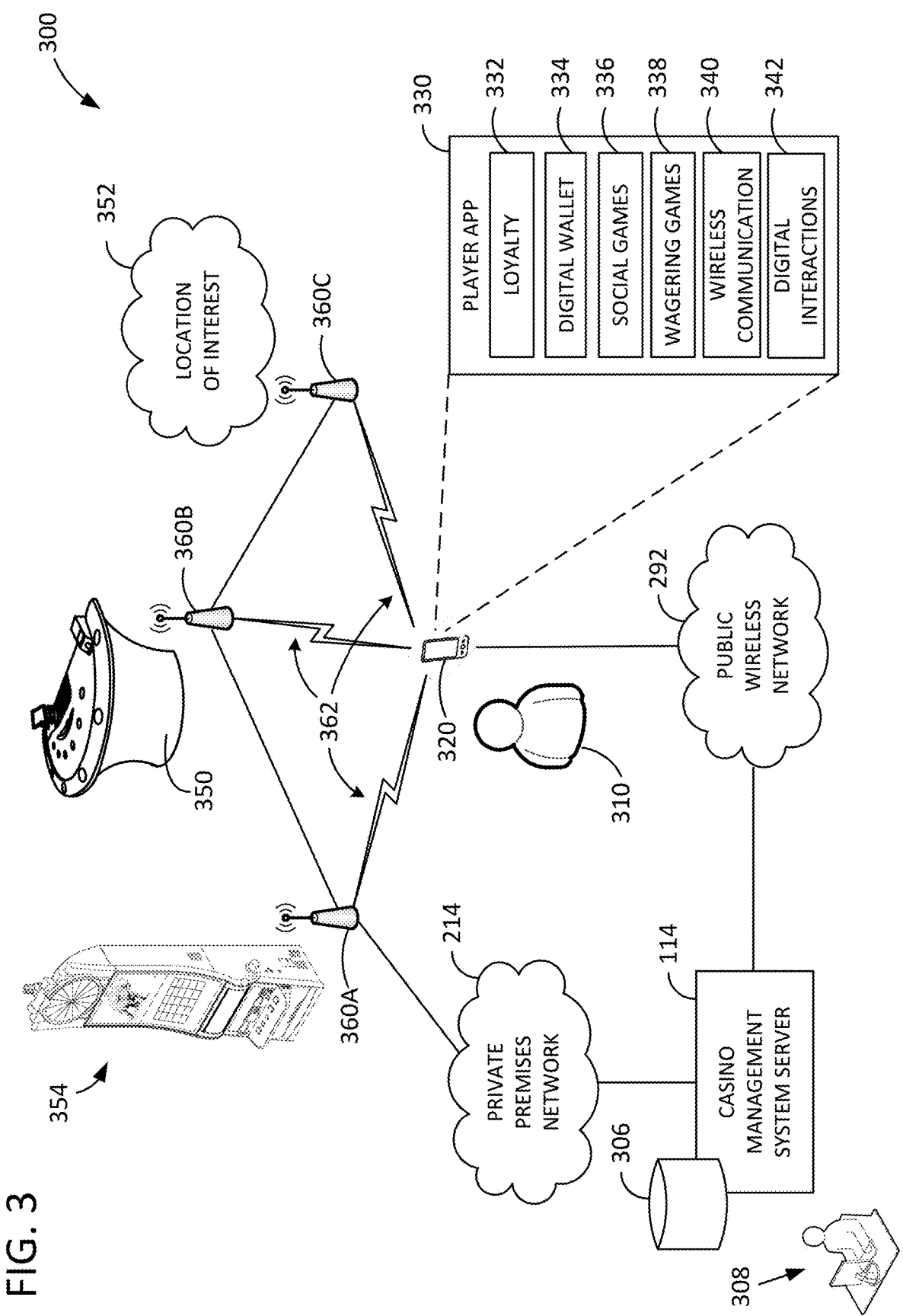
FIG. 3 is a network architecture diagram illustrating an example system for providing proximity-based digital interactions.

FIG. 3 is a network architecture diagram illustrating an example system for providing proximity-based digital interactions (or just "digital interactions system") 300. In the example embodiment, the interactions system 300 utilizes various beacons 360A, 360B, 360C (collectively, "beacons 360") to wirelessly broadcast one-way transmissions to mobile computing devices of nearby patrons, such as the mobile device 320 of patron 310. Beacons 360 may be similar to beacon 246 (shown in FIG. 2A). Mobile device 320 may be similar to the personal mobile device 248 (shown in FIG. 2A), the mobile gaming devices 256 (shown in FIG. 2B), or the EUDs 264 (shown in FIG. 2C). In the example embodiment, beacons 360 are configured as a one-way beacons (e.g., transmission only), such as conforming to the Bluetooth® 4.0 Low Energy standard, thereby allowing one-way transmission of messages from the beacons 360 to nearby mobile devices 320 or other nearby receptive computing devices. These one-way transmissions provided by the beacons 360 are referred to herein as "interaction prompt messages," as they are configured to initiate digital interactions with nearby mobile devices 320. These interaction prompt messages, when read by the mobile device 320, cause the mobile device 320 to initiate, often-times automatically, particular digital interactions with patrons 310 as they walk near the beacons 360 (e.g., based on proximity to particular locations when the beacons 360 are positioned near those locations). For example, prompted digital interactions may include receiving free play credits for a nearby EGM 354 or table game 350, providing information about nearby games (e.g., help screens for EGM 354, game play rules for table game 350), or linking to a ticket sales page for a show at a nearby location of interest 352 (e.g., near a theatre box office, near signage advertisement for the show, or the like).

To provide such proximity-based digital interactions, in the example embodiment, the beacons 360 are positioned near (e.g., within) particular devices or other locations of interest 352. Devices configured with their own beacons 360 (e.g., internal to, mounted to, or otherwise integrated with their own beacons 360) may be referred to herein as "beaconed devices," or a "host device" for a particular "hosted" beacon 360. Hosted beacons 360 may draw power from a shared power feed of the host device or share other common resources (e.g., network interfaces). Beaconed devices may include, for example, EGMs 104, 200, 340, a bank 252 of EGMs, table games or smart tables 294, 350, kiosks 260, signage (not shown, e.g., advertisement signs, digital displays), vending machines (not shown), service robots (not shown), or point of sale devices. For example, the EGM 354 may have a hosted beacon 360A installed within the cabinet 218 of the EGM 354, or the table game 350 may integrate a hosted beacon 360B within or mounted to the table.

Beacons 360 may be integrated within a player tracking interface such as the player tracking interface 232 of FIG. 2. Some beacons 360, referred to herein as "stand-alone beacons," may be installed and powered independent of any other device (e.g., in a dedicated housing containing the beacon 360 and other supporting components for networking, power, processing, memory, and the like). For example, a bar or restaurant may install a stand-alone beacon 360 near a location of interest 352, such as the entrance to the bar or restaurant (e.g., in a host stand, near a menu display).

The beacons 360 are configured (e.g., via remote device configuration or settings changes from the casino management system server 114) to broadcast specific data that can be used to prompt nearby devices to participate in an interaction event. The interaction prompt message(s) broadcast by the beacons 360 include a data payload (or just "payload") that may be read and processed by nearby devices 320 (e.g., devices having Bluetooth® receivers or other wireless receivers consistent with the one-way transmitters of the beacons 360). The payload may include an action identifier or a uniform resource locator ("URL") that may be used to trigger a particular interaction event on the device 320. The action identifier may be a numeric or alpha-numeric identifier that is assigned to, and thus can be used by the digital interactions system 300 to reference, a particular interaction event. The URL may be used as a link to a backend resource that is configured to initiate a particular interaction event.

In some embodiments, beacons 360 may be assigned unique device identifiers (IDs) and the payload may, additionally or alternatively to the action ID or URL, include the unique beacon device ID. As such, the digital interactions system 300 may configure one or more interaction prompt messages specific to particular beacons 360. For example, a newly installed EGM 354 may be configured with a tutorial interaction event specific to the game title running on that EGM 354, thereby allowing nearby patrons 310 to read about that game play. In some embodiments, beacons 360 may be assigned a device type (e.g., digital game type, device type, manufacturer type, card game type, or any combination of such) and the payload may, additionally or alternatively to the action ID or URL, include the device type. As such, the digital interactions system 300 may configure one or more interaction prompt messages specific to particular device types (e.g., a particular interaction event for all "Buffalo Gold®" EGMs 340). For example, all hosted beacons 360A of EGMs offering a particular promoted game title may be configured with a promotional offer interaction event, such as 100 free play credits, thereby attracting nearby patrons 310 to play EGMs 340 with that particular game title.

To enable interaction events between the beacons 360 and the mobile devices 320, the mobile devices 320 are configured to receive and process the interaction prompt messages. More specifically, in the example embodiment, the patron 310 installs a player app 330 onto their mobile device 320. The player app 330 provides a loyalty component 332, a digital wallet component 334, a social games component 336, a wagering games component 338, and a wireless communications component 340. The loyalty component 332 may allow the patron 310 to register for a loyalty account, view loyalty status information for their existing loyalty account, view or edit account profile information, redeem loyalty rewards accrued under their loyalty account, or the like. The digital wallet component 334 may allow the patron 310 to store payment card or account information, perform transactions from or to accounts or payment cards, or view rewards data or redeem awards. The social games component 336 provides access to various social games that may be played by the patron 310 on their mobile device 320 (e.g., using virtual currencies or other non-wagering game play). The wagering games component 338 allows the patron 310 to participate in various wagering games on their mobile device 320 (e.g., using various real currencies via their digital wallet or other player accounts). Wagering games may require the patron 310, and their mobile device 320, to be within at a physical venue of an operator, which may be determined and verified by GPS location data of the mobile device 320 and geofencing, or other location verification technologies.

Further, in the example embodiment, the mobile device 320 includes a wireless receiver (not separately shown) that allows the mobile device 320 to receive wireless communications, such as interaction prompt messages, from the one-way beacons 360. Such wireless one-way communications are illustrated in FIG. 3 by wireless links 362 between the mobile device 320 and one or more nearby beacons 360. In such unidirectional embodiments (e.g., with one-way broadcasting from beacon(s) 360), any given mobile device 320 within proximity of any one or more particular beacons 360 may receive and process any or all interaction prompt messages received by the mobile device 320. The wireless communication component 340 allows the mobile device 320 to receive interaction prompt messages (e.g., performing communications processing as part of a network stack for the wireless receiver), and a digital interactions component 342 processes any received interaction prompt messages and performs any associated interaction events implicated by the received messages, perhaps in conjunction with a remote server such as the casino management system server 114 or another network-accessible resource. In some embodiments, the player app 330 may additionally be used to establish cardless connection with gaming devices 104, smart tables 294, kiosks 260, or other devices one-way or two-way beaconed devices through the wireless communication component 340 (e.g., to perform digital wallet transactions with the device, to enter into rated session play under their loyalty ID with the device, or the like).

During operation, beacons 360 may be configured to broadcast one or more interaction prompt messages. For example, the hosted beacon 360A of the EGM 354 may be configured to broadcast a first interaction prompt message that provides a free play credits promotional offer interaction event as well as a second interaction prompt message that provides help screens for the game title provided by the EGM 354. Beacons 360 may be configured to transmit interaction prompt messages periodically (e.g., at a preconfigured broadcast frequency, such as once per second, twice per second, or once every five seconds). In some embodiments, beacons 360 may be configured based on state information from their hosting device. For example, in some embodiments, the system 300 may be configured to transmit certain interaction prompt messages (e.g., game promotions) when the EGM 354 is in an idle state (e.g., when available for game play but currently occupied). In some embodiments, the server 114 or the hosting EGM 354 may reconfigure the beacon 360A based on the state information of the hosting device. In another example, when the EGM 354 is currently being played but the gaming session is an uncarded session (e.g., occupied by an anonymous patron, a patron that has not presented a loyalty card), the system 300 may transmit an interaction prompt message to entice the patron to, for example, establish identity with the EGM 354 (e.g., provide their loyalty card, connect with their mobile device 320) or register for a loyalty program. In some embodiments, the system 300 may be configured to transmit certain interaction prompt messages (e.g., connection suggestion) for "unconnected patrons," when the EGM 354 is currently being played but the patron 310 has not wirelessly connected with the EGM 354 (e.g., as described below with respect to FIGS. 4-7).

When a device, such as the mobile device 320 of the patron 310, is brought into receiving range of the beacon 360, and when the device 320 is configured to listen for such broadcast messages (e.g., when the player app is running on the mobile device 320, when the wireless receiver is enabled), the device 320 receives and processes the interaction prompt message(s) of nearby beacons 360. Continuing the above example, when the mobile device 320 is brought near the hosted beacon 360A of EGM 354, the wireless communication component 340 receives both the first and second interaction prompt messages and reads the contents of each message. In the example embodiment, the player app 330 provides a graphical user interface on the mobile device 320 through which interaction events are provided to the patron 310. For example, when the first interaction prompt message for free play credits on the EGM 354 is received, the player app 330 may display an interaction activation screen that provides the patron 310 with an offer to receive the free play credits (e.g., via virtual button press on the mobile device 320 to signal patron activation). When multiple interaction prompt messages are received, the interaction activation screen may present multiple options for interaction events (e.g., one for viewing/activating the free play credits offer, another for viewing help screens for the game title running on the EGM 354).

When the patron 310 activates a particular interaction event, the player app 330 performs steps to complete the interaction event. Some interaction events, referred to herein as "locally performed events," may be performed solely by the player app 330 (e.g., without external communication to the casino management system server 114). For example, upon activation of the above example second interaction prompt message (providing help screens for a game title), the player app 330 may already have the help screens locally stored on the mobile device 320. Accordingly, the player app 330 may identify the game title associated with the second interaction prompt message based on comparison of an action ID provided in the second interaction prompt message and a table of game titles and associated action IDs. Once the game title has been determined, the player app 330 may display the associated help screens on the mobile device 320 and complete the interaction event.

Other interaction events, referred to herein as "networked events," include communications and actions performed external to the mobile device 320 (e.g., via networked communications with the casino management system server 114). For example, upon activation of the above example first interaction prompt message (for free play credits on the EGM 354), the mobile device 320 may create and transmit an event activation message to the casino management system server 114, and the server 114 may contribute in completing the interaction event (e.g., identifying what type of event has been activated, where the free play credits are to be applied, applying the free play credits to a particular EGM 354, or the like). Once the casino management system server 114 completes the event, the server 114 may transmit an event completion message back to the mobile device 320. In some embodiments, the interaction event may involve a URL. As such, the player app 330 may be configured to directly access the URL (e.g., via networked communication to an online site identified by the URL) or may indirectly access the URL by transmitting the URL in an event activation message to the casino management system server 114, which may process the URL as a proxy for the mobile device 320.

Various types of interaction events may be supported by the digital interactions system 300 and configured on any of the beacons 360.

One example type of interaction event is a wagering interaction event. Wagering interaction events are directed at improving patron interaction with wagering devices and other wagering activities. In one example embodiment, a wagering interaction event can include providing free or discounted wagering funds that can be used to participate in wagering activities (e.g., free credits for EGM game play, free chips for table game play, free spins on slot-style EGMs, free hands of video poker, free or discounted tournament entry, or the like).

Upon receipt of a wagering interaction event, the player app 330 may communicate with the casino management system server 114 to complete the interaction event. For example, when the patron 310 activates a wagering interaction event that provides free credits or free spins on the EGM 354, the mobile device 320 may transmit an event activation message to the casino management system server 114 (e.g., via wireless connectivity between the mobile device 320 and a public wireless network 292 at a venue premises). The event activation message may include, for example, an action ID that is pre-configured for the particular interaction prompt message to provide game play credits. The casino management system server 114 determines that the provided action ID is associated with free game play credits and provides the free game play credits for the patron 310.

In some embodiments, the wagering funds may be directly targeted and applied to a particular EGM 354. For example, the event activation message may include a device identifier of the beacon 360A or a device identifier of the hosting device from which the interaction prompt message was received. As such, the casino management system server 114 may reference which particular EGM 354 is associated with the event activation message and, once determined, may transmit a credit application message to the EGM 354 to credit the wagering funds to that EGM 354.

In some embodiments, the casino management system server 114 may verify that the patron 310 has an active gaming session established on the subject EGM 354 before applying the wagering funds. For example, the casino management system server 114 may track and monitor active gaming sessions on various EGMs 340 within the venue. Before processing application of wagering funds to a target EGM 354, the server 114 may establish an identity of the activating patron and compare that identity to whatever gaming session is currently active on the EGM 354. The casino management system server 114 may determine an identity of the patron 310 based on, for example, the communications session through which the activation event message was received (e.g., associated with a player loyalty ID) or via a unique player ID provided in the activation event message. If the activating patron identity does not match the carded patron identity on the EGM 354, the server 114 may cancel the interaction event without application of the wagering funds. In some embodiments, the server 114 may apply the wagering funds as long as there is an active gaming session on the EGM 354, even if the session is uncarded (e.g., not associated with a known patron). In some embodiments, the server 114 may apply the wagering funds even if there is no active gaming session on the EGM 354.

In some embodiments, wagering funds may be applied to an account of the patron 310. For example, the server 114 may determine an identity of the patron (e.g., as described above) and may provide the wagering funds by, for example, performing a transaction to a digital wallet of the patron (e.g., as a redeemable digital reward, as a deposit into a play account). Once the transaction is complete, the server 114 may transmit a completion message back to the mobile device 320. Accordingly, the patron 310 may then apply the wagering funds by, for example, using their digital wallet to redeem the newly received reward or wagering funds. In table game settings, a dealer may transfer funds to escrow from an account of the patron 310 (e.g., via a table management device, not shown) and the beacon 360B may be configured to transmit an interaction event customized for receipt by the mobile device 320 of the patron 310 to accept transfer of the funds. Once the patron 310 has activated the event to confirm the transfer, the funds may be transferred out of escrow to the house, and the dealer may receive a confirmation of the transfer and provide the funds to the patron 310 (e.g., in chips at the table, as a new TITO ticket, or the like).

For some gaming and other wagering activities (e.g., mobile wager gaming, mobile sports wagering, or the like), the patron 310 may be required to be on site at a wagering venue. In some embodiments, the system 300 may verify that the patron 310 is at the venue using wagering interaction events. For example, beacons 360 at the venue may be configured to broadcast location verification messages. Such location verification messages may include a customized identifier, or "verification ID," that can be read by the mobile device 320 and transmitted back to the system 300, thus verifying that the mobile device 320 is within wireless proximity of at least one of the beacons 360, and therefore on site. In some embodiments, the server 114 may be configured to reconfigure the location verification messages with a new verification (e.g., random rotating verification identifiers, changed at predetermined intervals, such as every five minutes, ten minutes, thirty minutes, hour). In some embodiments, the system 300 may require the mobile device 320 to recertify location (e.g., every five minutes, ten minutes, thirty minutes, hour) in order to continue such venue-restricted gaming. For example, after initial venue verification by the mobile device 320, the server 114 may prompt the mobile device 320 to recertify by rereading the current location verification message and providing the current verification ID to the server 114. In some embodiments, the mobile device 320 may be required to include the current verification ID for every real money wagering activity (e.g., at the time a wager is placed).

Another example type of interaction event is a non-wagering interaction event. In some embodiments, non-wagering interaction events may be directed at providing promotional advertisements related to, or discounts on, goods or services (e.g., other than wagering activities). In one example embodiment, a non-wagering interaction event can include providing advertisements for goods or services offered at or near the venue. For example, some non-wagering interaction events may advertise show times and ticket sales. Some non-wagering interaction events can include providing free or discounted goods or services. For example, some non-wagering interaction events may provide a free or discounted meal at a nearby restaurant, free or discounted drinks from on-floor cocktail services or vending, or discounted show tickets or other entertainment activities.

Upon receipt of a non-wagering interaction event, the player app 330 may communicate with the casino management system server 114 to complete the interaction event. For example, for advertisement events (e.g., those events that provide promotional material but do not involve free or discounted rewards), the mobile device 320 may transmit an event activation message to the casino management system server 114 indicating an action ID or URL that is associated with an advertisement for an evening show. In response, the server 114 may transmit advertisement content back to the mobile device 320 for display to the patron 310. In some embodiments, the advertisement content may include links to additional content or services. For example, the example show advertisement may include a link to a ticket sales service that can perform ticket sales for that show. As such, the player app 330 may allow the patron 310 to activate the link and be redirected to ticket sales through their mobile device 320.

When non-wagering interaction events include offers for discounted goods or services, these "discounts" may be transferred to the patron 310 in various ways. In some embodiments, discounts may be transferred to the digital wallet of the patron 310 (e.g., as a digital reward, digital coupon, or the like). For example, a discount for a free drink may be provided by the server 114 by generating and transferring a digital coupon to the digital wallet of the identified patron 310. As such, the patron 310 may receive the discount by redeeming the digital coupon at the appropriate venue. In some embodiments, discounts may be redeemed by a code shown or otherwise provided at a targeted vendor using the mobile device 320. For example, the server 114 may respond to the event activation message for a free buffet at a venue restaurant by generating and transmitting a QR code back to the mobile device 320. To redeem, the patron 310 may show the QR code to staff at the restaurant, who may subsequently scan the QR code and apply the discount. In some embodiments, discounts may be provided for online orders for goods or services performed through the mobile device 320. For example, the server 114 may respond to an event activation message for a 10% discount on show tickets by transmitting a discount code for the show tickets, as well as a link to an online retail site for the show tickets. The link may pre-populate the discount code in an online order, thereby allowing the mobile device 320 to complete an online purchase for the discounted goods or services with the discount automatically applied.

In some embodiments, a beacon 360C may be installed at or within signage that is advertising particular goods or services (e.g., where the location of interest 352 is the advertisement of interest). Further, the beacon 360C may be configured to provide additional advertisement content, or particular discounts for those goods or services (e.g., via non-wagering interaction events). Accordingly, a patron 310 that approaches the signage for closer inspection may be automatically directed to additional content about those goods or services, or automatically directed to an online retailer offering those goods or services, perhaps with discounts automatically applied. Such proximity-based interactions and integration with conventional signage provides automatic connectivity to related content and sales.

In some embodiments, non-wagering interaction events may provide access to social game play or related features. Some non-wagering interaction events may be configured to allow the patron 310 to access and play a game title provided in a social game play platform (e.g., using virtual currencies, virtual credits, or the like). For example, upon receipt of an interaction prompt message including an action code that is associated with social game play of a particular game title, the mobile device 320 may locally perform the action associated with the action code. More specifically, if the game title is already locally installed on the mobile device 320, the mobile device 320 may initiate, unlock, or otherwise enable social game play for that game title on the mobile device 320. If the game title is not yet locally installed, the mobile device 320 may initiate an installation of the game title on the mobile device 320. In some embodiments, the social game interaction event may include transfer of a pool of virtual credits or virtual currency that may be used to play the social version of the game title.

Another example type of interaction event is an informational interaction event. Non-wagering interaction events are directed at providing information to the patron 310. In some embodiments, informational interaction events include providing gaming information, such as help screens or game play instructions for particular wagering games (e.g., for slot-style EGMs 340, for table games, or the like). In some embodiments, informational interaction events include providing localized information of interest (e.g., menu information from a beacon 360 at the entrance to a restaurant, a site map from a beacon 360 at the entrance to a casino or hotel). In some embodiments, beacons 360C may be provided at valet and informational interaction events may include information about valet services or link to requesting vehicle delivery. In some embodiments, beacons 360C may be provided at venue swimming pools, spas, or other recreational locations, and informational interaction events may include information about recreational events or services provided at that location, links to menus or ordering sites, or the like.

Upon receipt of an informational interaction event, if the player app 330 has the associated information stored locally, the player app 330 may display the information to complete the event. If the information is not available locally on the mobile device 320, the mobile device 320 may communicate with the casino management system server 114 to complete the event. For example, for informational events, the mobile device 320 may transmit an event activation message to the casino management system server 114 indicating an action ID or URL that is associated with the desired informational content. In response, the server 114 may transmit the informational content back to the mobile device 320 for display to the patron 310. In some embodiments, the advertisement content may include links to additional content or services. For example, the menu content for a restaurant may include a link to an online ordering service for that restaurant, or the site map content for the venue may include links to online sites of various retail outlets appearing on the site map. As such, the player app 330 may allow the patron 310 to activate the link and be redirected to additional information or online services through their mobile device 320.

In some embodiments, the digital interactions system 300 may provide a sequence of interactions to promote game play of a particular game title, game type, or table game that starts with an interaction event. For example, the beacon 360A of EGM 354 or the beacon 360B of table game 350 may transmit an informational interaction event message that provides a digital flyer advertising the game. This informational interaction event may provide a link to a tutorial (e.g., with rules, instruction, video) for that game. The system 300 may provide play incentives to the patron 310 for interacting with the digital flyer or the tutorial. For example, the system 300 may provide access to a non-wagering or wagering mobile version of the game (e.g., via a link to access the mobile game, a link to install the mobile game, unlocking access to the mobile game, or the like) and may provide play credits (e.g., virtual currency, real money credits, free plays, or the like).

In the example embodiment, the digital interactions system 300 is centrally controlled and configured by an administrative graphical user interface ("GUI") (not separately depicted) provided on the casino management system server 114. The administrative GUI allows an administrator 308 to configure various aspects of the system 300, such as pushing configuration settings changes to beacons 360, creating new interaction events that can be broadcast by beacons 360, creating interaction groups, assigning interaction groups to particular interaction events, or administering schedules for changes to interaction events deployed on beacons 360. The interactions system 300 uses a system database 306 to store system data such as, for example, configuration settings, event content and links, and interaction event logs.

In the example embodiment, the administrator 308 configures interaction events for the system 300. Interaction events are defined by an event code that can be broadcast by the beacons 360 and an action to be performed when an event with that event code is triggered. Event codes can be in the form of an action ID (e.g., a numeric or alpha-numeric string), a URL, or a category code (e.g., an ID representing a group of beacons 360 or beaconed devices). Actions are defined by an action type (e.g., wagering interaction events, non-wagering interaction events, informational interaction events) and an action procedure (e.g., the steps to execute to perform the action).

During configuration, the administrator 308 may create new action procedures for various actions (e.g., via programming, scripting) or may utilize preinstalled action procedures. When setting up a new interaction event, the administrator 308 may create or assign action IDs or category codes to the actions defined in the database 306. To activate a particular action ID or category code, the administrator 308 assigns that action ID or category code to particular beacons 360 for subsequent broadcast by those beacons 360. The database 306 maintains a list of beacons 360 and their assigned event codes. Assignment of action IDs, category codes, or URLs to particular beacons 360, in the example embodiment, causes the server 114 to transmit a reconfiguration message to the targeted beacons 360 that includes an event code (e.g., a type code identifying whether the interaction event will include an action ID, a URL, or a category code) and the assigned action ID, URL, or category code. The server 114 communicates with beacons 360 via the private premises network 214. Upon receipt of the reconfiguration message, the receiving beacon 360 configures or reconfigures an interaction prompt message to be broadcast based on the received configuration settings. In some embodiments, the beacons may support broadcasting multiple interaction prompt messages. Accordingly, the system 300 may track the various interaction prompt messages configured on each beacon (e.g., via a message index or the like) and may include, in the reconfiguration message, a message index indicating which interaction prompt message on the beacon 360 to apply the configuration change. Once the configuration change is complete, the beacon 360 begins broadcasting the associated interaction prompt message to nearby devices. Subsequently, during processing of an interaction event (e.g., sent by the mobile device 320), the casino management system server 114 uses the configurations in the database 306, along with the received action ID, URL, or category code, to determine what action to perform, thereby connecting the interaction events with the configured actions for those events.

Some interaction events may be manually or automatically created and configured for specific individuals. Such interaction events may be referred to herein as "targeted interaction events," as they target a particular patron 310. For example, the administrator 308 may configure targeted interaction events to be created and deployed when any patrons 310 achieve a new loyalty level, or when a particular group of patrons 310 are first detected at the venue (e.g., when a platinum member first cards into a gaming session of the day). Upon detection of a triggering event for a particular patron 310, the server 114 may create a custom action ID for this targeted interaction event (e.g., unique to that patron 310) and may reconfigure one or more beacons 360 to broadcast that action ID. In determining which of the beacons 360 to broadcast this targeted interaction event, the server 114 may determine a current location of the targeted patron 310 (e.g., based on carded session play at a particular EGM 354 or gaming table 350, player location tracking through their mobile device 320). The server 114 may use that player location data to select one or more nearby beacons 360 for this targeted interaction event (e.g., based on a proximity map of beacon coverage, based on the particular EGM 354 or gaming table 350 of the carded session play). Once one or more beacons 360 have been identified for this targeted interaction event, the server 114 may transmit configuration message(s) to those selected beacons 360, which causes those beacons 360 near the patron 310 to begin broadcasting that targeted interaction event. Accordingly, upon receipt of the targeted interaction event, the patron 310 may activate the event via their mobile device 320. After activation or refusal of the targeted interaction event by the patron 310, the server 114 may deactivate (e.g., remove, delete) the targeted interaction event from any and all of the selected beacons 360 through a configuration message to those beacons 360.

In one example embodiment, the system 300 provides a network protocol for the interaction prompt messages broadcast by the beacons 360. Each broadcast may include a message header and a message payload (e.g., all of which may be a payload to a lower layered protocol for the wireless communications). In the example embodiment, the message header includes a 1-byte ID indicator (e.g., a flag or code indicating whether a machine ID is included in the message payload) and a 1-byte event code (e.g., defining whether the payload includes an action ID, a URL, or a category code). When a machine ID is indicated as being included in the message payload, the first M bytes of the message payload are read as a machine ID, where M is a predetermined number of bytes sufficient to store unique machine IDs for the beacons 360 (e.g., 8 bytes, 16 bytes, or the like). When the event code indicates an action ID or category code, the next N bytes of the message payload are read as an action ID or category code, where N is a predetermined number of bytes sufficient to store action IDs or category codes (e.g., 4-byte int, 8-byte string, or the like). The message header or message payload may include additional or alternative data fields that facilitate the embodiments described herein.

In some examples, a beacon transmission can be configured using a command sent to a beacon transmitter, e.g. from a player tracking interface controlling the beacon transmitter. Multiple beacon frames can be configured, e.g. for messages having payload exceeding the capacity of a single frame. As an illustration, a 41 byte command packet can be used, with byte 0 specifying a frame, bytes 1-9 specifying a security code ("PIN") of the transmitter, and bytes 10-40 specifying 31 bytes to be transmitted, sometimes called the "advertisement" of the beacon. Within the 31 byte advertisement, various fields can include one or more of: advertisement length, frame number, manufacturer code, beacon type, a transmitter identifier, an Internet protocol address ("IP address"), a transmit power, action ID, other payload, or other fields. One or more such fields can be omitted, or other fields can be introduced. This advertisement format is merely illustrative, and other formats, lengths, and frame configurations can be used. Where multiple frames are used, they can be independently activated. To illustrate, a beacon transmitter can store one default frame for transmissions to patrons not registered at a proximate gaming device, another custom frame for transmissions to a registered patron who may be playing on the gaming device, and a further custom frame for a particular promotion unrelated to the gaming device, and the frames can be selectively transmitted or transmitted in rotation. In some embodiments, multiple frames may be used for a single interaction event. For example, a message payload that includes a URL for a particular interaction event may be too large to fit within a 31 byte advertisement field of a single frame. Accordingly, such interaction events may configure multiple frames to provide a single interaction event by breaking up the message payload across multiple advertisement fields of those frames and the receiving mobile device 320 can reform the message payload by combining the content of those multiple frames. The beacon transmitter can acknowledge a received command packet.

The identifier and payload, as well as other fields, can be configured by a casino operator, statically or dynamically. That is, a default identifier and payload can be configured for the beacon transmission, and one or the other or both can be customized for a particular patron, a particular promotion, or for other uses.

While many of the example provided herein may be described in relation to a particular land game (e.g., a physical gaming device, such as EGM 354 or table game 350) or to mobile gaming (e.g., digital games accessible by mobile devices, such as mobile device 320), and in either wager gaming (e.g., real currency) or social gaming (e.g., virtual currency), it should be understood that such embodiments may be applicable to any of these platforms or currencies.

An example method for registering a patron device at an electronic gaming device, is described with the aid of FIGS. 4-5. FIG. 4 is a flowchart 401 and FIG. 5 is a sequence diagram 402 illustrating certain operations of the method. In this method, a patron near an electronic gaming device is registered as a player at a player tracking interface associated with the electronic gaming device. The sequence diagram 402 shows interactions between four entities that can participate in this method: network server 405, gaming device 415, player tracking interface 425, and patron device 435. Sequence diagram 402 is an illustrative example of flowchart 401; other examples of flowchart 401 can be implemented with different entities.

Starting with the flowchart 401, at process block 410 a first indication ("presence indication") can be received that patron device 435 is near gaming device 415. In some examples, this indication can be received at player tracking interface 425 from network server 405, as illustrated by arrow 412 of sequence diagram 402. A determination of the proximity between gaming device 415 and patron device 435 can be based upon locations of patron device 435 and gaming device 415. However, neither of these features are requirements. In other examples, a determination of proximity can be made using one or more cameras or rangefinders located at gaming device 415 or at patron device 435.

At process block 440, a custom identifier can be transmitted on a wireless one-way channel. In some examples, this message can be transmitted by a Bluetooth® beacon transmitter incorporated within player tracking interface 425, and can be received by a Bluetooth® receiver of patron device 435, as illustrated by arrow 442. The custom identifier can be time-sensitive or time-limited, and can be transmitted for a small time window in a range 10 s to 10 minutes ("min"), and often about 1 min. The custom identifier can be specified for one-time usage, and can be discarded after the transmission time window has expired or patron device 435 has used the custom identifier to associate with player tracking interface 425 or gaming device 415. In some examples, the custom identifier can be associated with a promotion or invitation for play at gaming device 415. However, neither of these are requirements. In other examples, the beacon transmitter can be part of gaming device 415, or can be a distinct device coupled to gaming device 415 or to player tracking interface 425. The custom identifier can be associated with a promotion for another promotional item not associated with gaming device 415, or the custom identifier can be associated with a notification to the patron carrying patron device 435.

At optional process block 450, a second indication ("play indication") can be received that the patron associated with patron device 435 seeks to initiate play at gaming device 415. The second indication can be based on all or part of the custom identifier, so as to close the loop between player tracking interface 425 and patron device 435, allowing secure association between patron device 435 (and the associated patron) and player tracking interface 425. In some examples, this indication can be received at player tracking interface 425 from gaming device 415, as shown by arrow 452. The second indication can be based on the patron pressing a button (e.g. a "Connect" button) on gaming device 415. However, neither of these are requirements. In other examples, the indication can be received from network server 405, and can be based on an action of the patron at patron device 435. Then, at process block 460, the patron can be registered at player tracking interface 425 associated with gaming device 415. Such registration can beneficially allow the patron's gameplay to be properly associated with the patron's profile, history, or credit account. In some examples, registration can involve an exchange of information between player tracking interface 425 and network server 405, as indicated by arrow 462, while in other examples registration can be performed autonomously by player tracking interface 425.

Numerous variations and extensions can be deployed. In some examples, patron device 435 can be a smartphone, while in other examples patron device 435 can be a proprietary or commercial device incorporating a wireless network module. Patron device 435 can include e.g. Wi-Fi and Bluetooth® capabilities but need not have cellular telephony capability. Gaming device 415 can be a single player casino gaming device, a two-player casino gaming device, or a multi-player smart casino gaming table.

The first indication received at block 410 can be responsive to a detection that patron device 435 is within a threshold region proximate to gaming device 415. (That is, patron device 435 and gaming device 415 can be determined to be near one another if patron device 435 is within the threshold region.) The detection can be based on any one or more of various messages, such as a message received over the wireless one-way channel at patron device 435, or a received signal strength ("RSSI") of such signal. The RSSI can be compared with a transmitted signal strength encoded in the message to determine a distance from the beacon transmitter. The comparison and determination of distance can be performed on patron device 435, or by network server 405 based on information relayed by patron device 435. The detection can be based on determining a location of patron device 435, for example by triangulation or trilateration. The triangulation or trilateration can be based on signals (commonly, three or more) received at patron device 435 or received from patron device 435, in any combination. The triangulation or trilateration can be performed on patron device 435, or can be performed at one or more other computing devices that are part of or coupled to network server 405. In further examples, the detection can be performed by acoustic or optical ranging, such as with one or more cameras mounted at gaming device 415 or at player tracking interface 425. That is, the first indication can be received by player tracking interface 425 directly from patron device 435, e.g. in the form of illumination directed from patron device 435 to be imaged at a camera associated with player tracking interface 425. In some examples, the threshold region can be omnidirectional in a horizontal plane about gaming device 415, while in other examples the threshold region can be shaped. Shaping can be according to a beam profile of the transmitted beacon. In varying examples, the threshold region can extend to a maximum of 1 m, 3 m, 5 m, or 10 m from gaming device 415.

The first indication received at block 410 can be responsive to an action of the patron on patron device 435. For example, the patron can take a picture of the proximate gaming device 415, or select an icon on a screen showing the location of patron device 435 within a casino. The patron can make a selection or take a picture by press of a button or by voice input to patron device 435. In further examples, the patron's action can provide a biometric input (e.g. fingerprint or iris scan) to patron device 435. An auxiliary indication of the user's action can be relayed from patron device 435 to network server 405, for example over Wi-Fi or another communication channel. Responsive to receipt of the auxiliary indication, the first indication can be transmitted from network server 405 to player tracking interface 425. The auxiliary indication or the first indication can incorporate information identifying the patron, patron device 435, or gaming device 415. The wireless link between patron device 435 and network server 405 can be a bidirectional link, can be a wireless link having longer range than the one-way beacon, or can be a cellular telephony link. In other examples, a patron action at the gaming device 415 or the player tracking interface 425, such as a keypress or other input, can demonstrate proximity and can result in the first indication.

Additional operations can be performed between process blocks 410 and 440. Optional process blocks 420, 430 are examples of such operations. At process block 420, responsive to receipt of the first indication at block 410, a custom identifier can be requested from network server 405. This request can be issued from player tracking interface 425, as shown by arrow 422. At process block 430, the requested custom identifier can be received. The custom identifier can be received at player tracking interface 425, from network server 405, as illustrated by arrow 432.

The custom identifier can be uniquely targeted for patron device 435, and can be disregarded by (or indecipherable to) any other patron devices that could be within range of a beacon from player tracking interface 425. The custom identifier can be associated with a message indicating a promotion associated with gaming device 415. The message can include a Uniform Resource Locator (URL) of a web page, a voucher for credits on gaming device 415, a voucher for a special mode on gaming device 415, or an unlock code for special gameplay on gaming device 415. In some examples, the message can exceed a maximum length of the beacon payload. Accordingly, transmitting the custom identifier at block 440 can include transmitting one or more portions of the message in one or more respective messages on the wireless one-way channel. In further examples, the custom identifier can be used for registration at block 460, while the indication of the promotion can be in a message obtained and transmitted by a beacon transmitter of player tracking interface 425. The message, indicating a promotion, can be transmitted after registration at block 460 is complete, which in turn is after the (first) custom identifier was transmitted at block 440.

The second indication can be responsive to an action of the patron on patron device 435. This action can include selection of an icon, a press of a button, a voice input, or presentation of a biometric input. To illustrate, receipt of the custom identifier can cause an app on patron device 435 to display or announce a promotion or invitation associated with gaming device 415. The patron's action can signify acceptance of the invitation or promotion.

In some examples, the patron's action can cause an auxiliary indication to be transmitted to network server 405, which in turn can cause the second indication to be transmitted from network server 405 to either gaming device 415 or player tracking interface 425. The auxiliary indication or the second indication can include information identifying the patron or patron device 435, or can include all or part of the custom identifier transmitted at block 440. The auxiliary indication can be transmitted using Wi-Fi, cellular telephony, or another wireless link (having longer range than the one-way beacon), any of which can be a bidirectional link. In other examples, the second indication can be transmitted directly from patron device 435 to either gaming device 415 or player tracking interface 425, using wireless (according to a communication standard different than the one-way wireless communication channel), or another form of communication such as optical or acoustic communication.

The second indication can be responsive to an action of the patron on gaming device 415. The patron's action can be a button press, a voice input, or presentation of a biometric input. The second indication can be responsive to presentation of patron device 435 at gaming device 415. To illustrate, the patron can present a code (e.g. a bar code or matrix code) on patron device 435 to a scanner or camera of gaming device 415. Alternatively, the patron can position patron device 435 to emit an acoustic signal to be received by a microphone of gaming device 415, or the patron can place patron device 435 in close proximity to a sensor of gaming device 415, which can cause gaming device 415 and patron device 435 to exchange information via NFC. In some examples, the patron's action, including presentation of patron device 435, can be provided to player tracking interface 425 instead of to gaming device 415.

The second indication can be received at player tracking interface 425 by monitoring communication from gaming device 415. To illustrate, such communication could indicate that the patron has pressed a Connect button on gaming device 415 to initiate play.

In additional examples, registering the patron at block 460 can include downloading information about the patron from network server 405; transmitting a confirmation message to the patron device 435; or transmitting a message indicating of a promotion to the patron device 435. One or both of these transmissions can be performed over the wireless one-way communication channel.

The instant method, including variations or extensions not limited to those described herein, can be performed by one or more hardware processors executing instructions stored on computer-readable media. Accordingly, such media can embody portions of the disclosed technologies.

Figure 6:
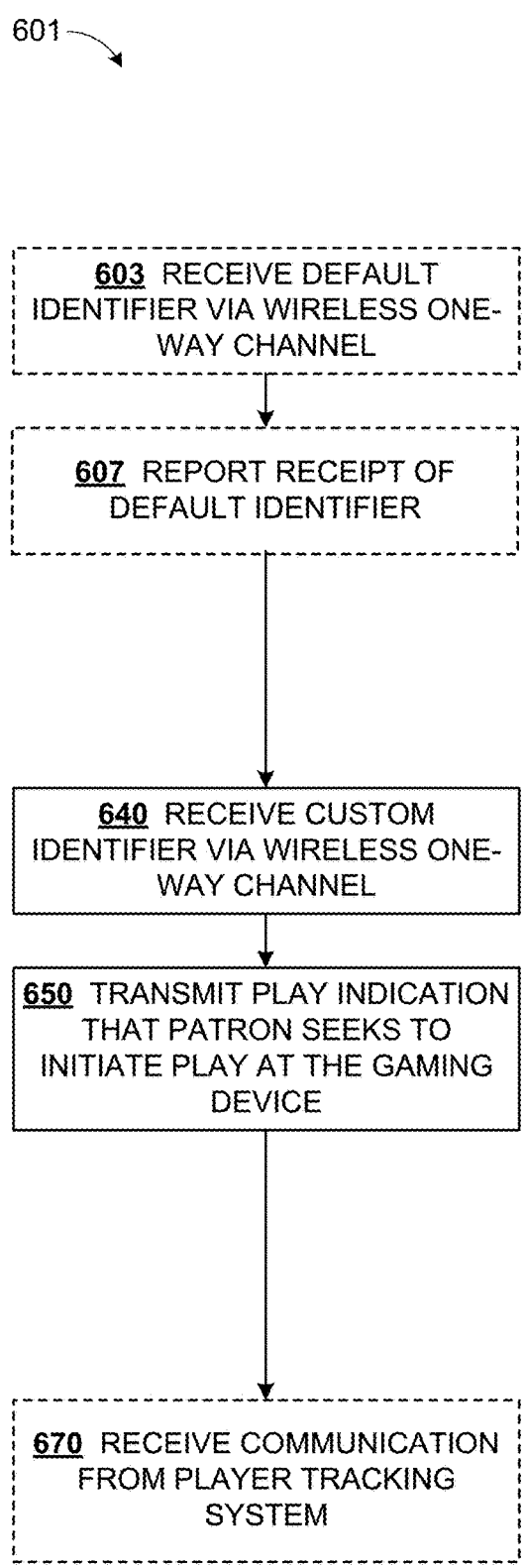
FIG. 6 is a flowchart illustrating an example method for initiating play at a gaming device according to the disclosed technologies.
Figure 7:
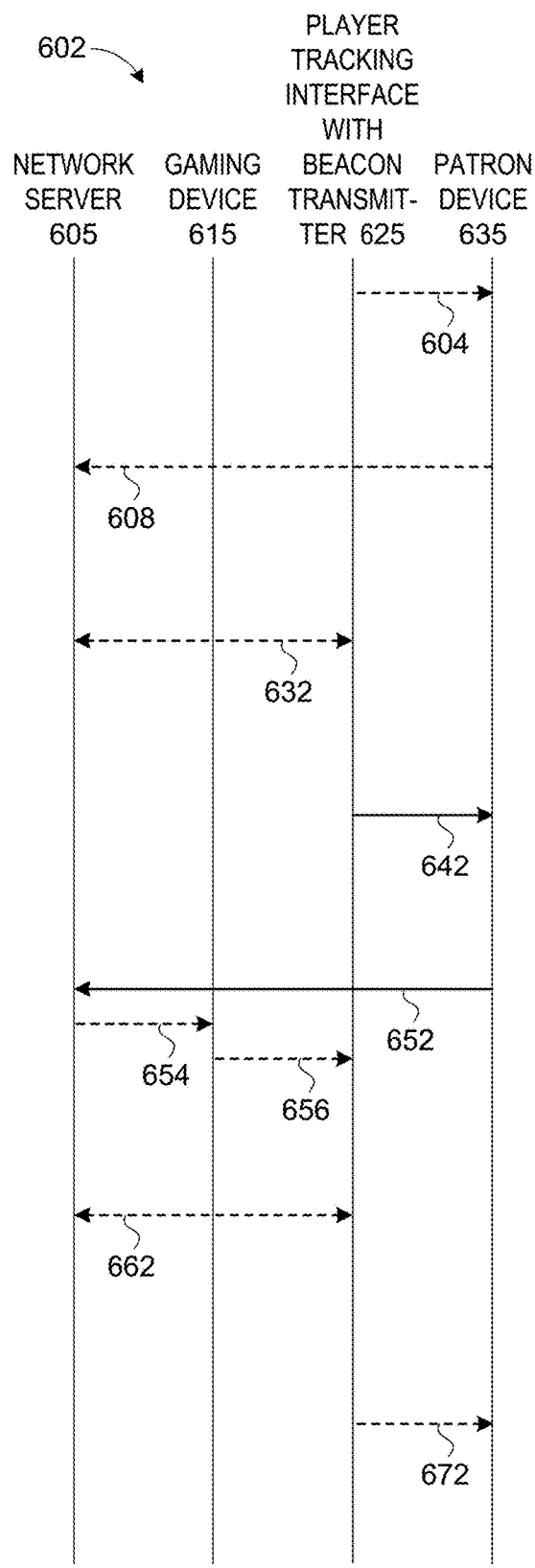
FIG. 7 is a sequence diagram illustrating certain operations of the example method of FIG. 6.

An example method for initiating play at an electronic gaming device, is described with the aid of FIGS. 6-7. FIG. 6 is a flowchart 601 and FIG. 7 is a sequence diagram 602 illustrating certain operations of the method. In this method, a patron device near an electronic gaming device receives a message and responds with an indication that an associated patron seeks to initiate play at gaming device. The sequence diagram 602 shows interactions between four entities that can participate in this method: network server 605, gaming device 615, player tracking interface 625, and patron device 635. Sequence diagram 602 is an illustrative example of flowchart 601; other examples of flowchart 601 can be implemented with different entities.

Starting with flowchart 601, at process block 640, a custom identifier can be received at patron device 635 over a wireless one-way channel. In some examples, this message can be received by a Bluetooth® receiver incorporated within patron device 635, from a Bluetooth® beacon transmitter of player tracking interface 625, as illustrated by arrow 642. In some examples, the custom identifier can include a promotion or invitation for play at gaming device 615. However, as for the method of FIG. 6, neither of these are requirements, and block 640 can be implemented in other ways.

At process block 650, a transmission can be made, providing an indication ("play indication") that the patron associated with patron device 635 seeks to initiate play at gaming device 615. In some examples, this indication can be transmitted from patron device 635 to network server 605, as shown by arrow 652. The second indication can be based on the patron making a selection on patron device 635. However, neither of these are requirements. In other examples, the indication can be transmitted directly to gaming device 615 or player tracking interface 625. In further examples, the second indication can be based on a patron action at gaming device 615.

Numerous variations and extensions can be deployed. In some examples, patron device 635 can be a smartphone, while in other examples patron device 635 can be a proprietary or commercial device incorporating a wireless network module. Patron device 635 can include e.g. Wi-Fi and Bluetooth® capabilities but need not have cellular telephony capability. Gaming device 615 can be a single player casino gaming device, a two-player casino gaming device, or a multi-player smart casino gaming table. One or both of the receiving or transmitting can be controlled by an app installed in patron device 635. The app can be provided on behalf of a casino in which gaming device 615 is located.

The custom identifier can be uniquely targeted for patron device 635, and can be disregarded by (or indecipherable to) any other patron devices that could be within range of a beacon from player tracking interface 625. The custom identifier can be associated with a message indicating a promotion associated with gaming device 615. The message can include a Uniform Resource Locator (URL) of a web page, a voucher for credits on gaming device 615, a voucher for a special mode on gaming device 615, or an unlock code for special gameplay on gaming device 615. In some examples, the message can exceed a maximum length of the beacon payload. Accordingly, receiving the custom identifier at block 640 can include assembling one or more portions of the message received in one or more respective messages on the wireless one-way channel. The custom identifier can be received from player tracking interface 625 near, directly attached to, or installed within gaming device 615.

The transmitted indication can be responsive to an action of the patron on patron device 635. This action can include selection of an icon, a press of a button, a voice input, or a biometric input. To illustrate, receipt of the custom identifier can cause an app on patron device 635 to display or announce a promotion or invitation associated with gaming device 615. The patron's action can signify acceptance of the invitation or promotion.

In some examples, the indication transmitted at block 650 can cause, in turn, one or more auxiliary indications to be transmitted from network server 605 to gaming device 615, and optionally from gaming device 615 to player tracking interface 625, as illustrated by arrows 654, 656. An alternative auxiliary indication can be transmitted from network server 605 to player tracking interface 625. Any of these indications can include information identifying the patron or patron device 635. Any of these indications can be transmitted over a wireless link, as described herein, that is different from the one-way wireless channel. In other examples, the indication can be transmitted at block 650 directly from patron device 635 to either gaming device 615 or player tracking interface 625, using wireless (according to a communication standard different than the one-way wireless communication channel), or another form of communication such as optical or acoustic signaling.

In other examples, the indication at block 650 can be transmitted from gaming device 615 to player tracking interface 625 responsive to a patron's action on gaming device 615. The patron's action can be a button press or a voice input. The indication can be responsive to presentation of patron device 635 at gaming device 615. To illustrate, the patron can present a code (e.g. a bar code or matrix code) on patron device 635 to a scanner or camera of gaming device 615. Alternatively, the patron can position patron device 635 to emit an acoustic signal to be received by a microphone of gaming device 615, or the patron can place patron device 635 in close proximity to a sensor of gaming device 615, which can cause gaming device 615 and patron device 635 to exchange information via NFC. The indication can be received at player tracking interface 625 by monitoring communication from gaming device 615. To illustrate, such communication could indicate that the patron has pressed a Connect button on gaming device 615 to initiate play.

In further examples, patron device 635 can receive a second custom identifier and can recognize that the second custom identifier is not targeted to patron device 635. Accordingly, patron device 635 can discard or ignore the second custom identifier.

Additional operations can be performed in conjunction with the instant method. For example, at optional process block 670, a communication can be received from player tracking interface 625 near gaming device 615. The communication can include an indication of a promotion, or a confirmation message indicating that the patron is registered for play at gaming device 615. In some examples, the communication can be received at patron device 635, as illustrated by arrow 672. The communication can be received over the wireless one-way channel, or can be uniquely targeted to patron device 635. For examples where the communication includes a promotion, the method can include presenting the promotion to the patron upon receipt of the communication, upon termination of the patron's play at gaming device 615, on a predetermined day (which can be in the future), at a predetermined time, or after a predetermined delay. In other examples, the communication can be received at network server 605.

In some examples, the communication can be based upon exchange of messages between player tracking interface 625 and network server 605, as illustrated by arrow 662. These messages can be responsive to the patron's play (or cessation of play) at gaming device 615, as monitored by player tracking interface 625.

In additional examples, the method can include receiving a default identifier via the wireless one-way channel at process block 603. The default identifier can be received at patron device 635 from player tracking interface 625, as illustrated by arrow 604. Thereupon, patron device 635 can report receipt of the default identifier at block 607. The report can be transmitted to network server 605, as illustrated by arrow 608. Between blocks 607 and 640, arrow 632 depicts one or more messages between network server 605 and player tracking interface 625 that can result in the custom identifier being provided to player tracking interface 625 for subsequent transmission at block 640.

The instant method, including variations or extensions not limited to those described herein, can be performed by one or more hardware processors executing instructions stored on computer-readable media. Accordingly, such media can embody portions of the disclosed technologies.

Figure 8:
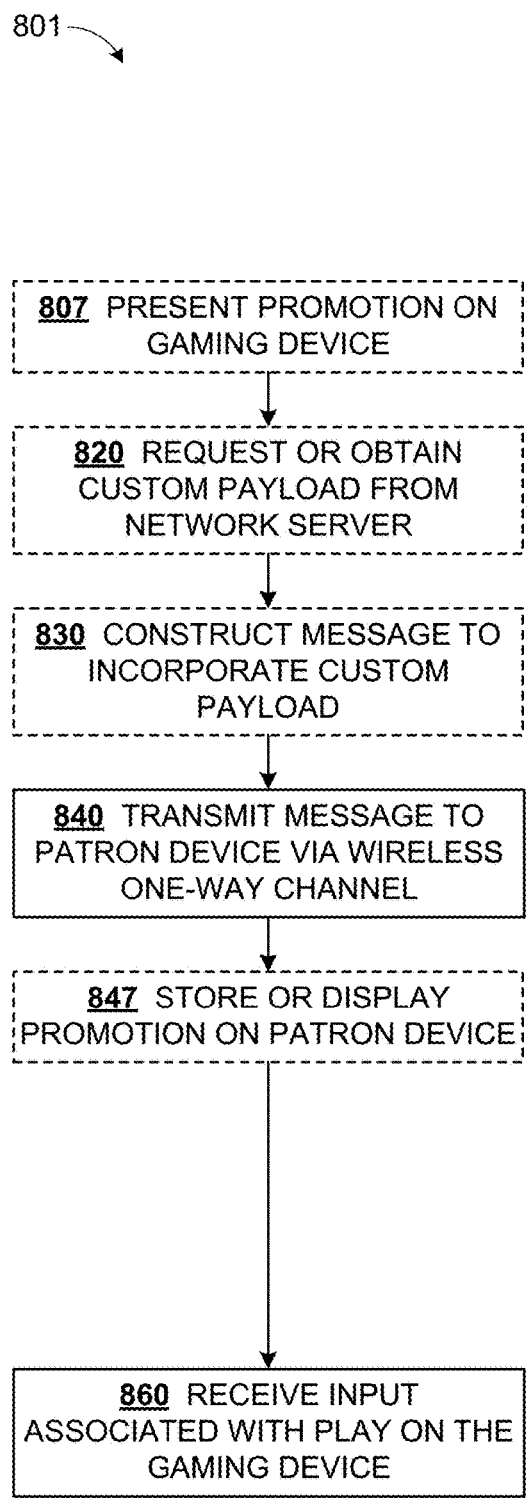
FIG. 8 is a flowchart illustrating a first example method according to the disclosed technologies.
Figure 9:
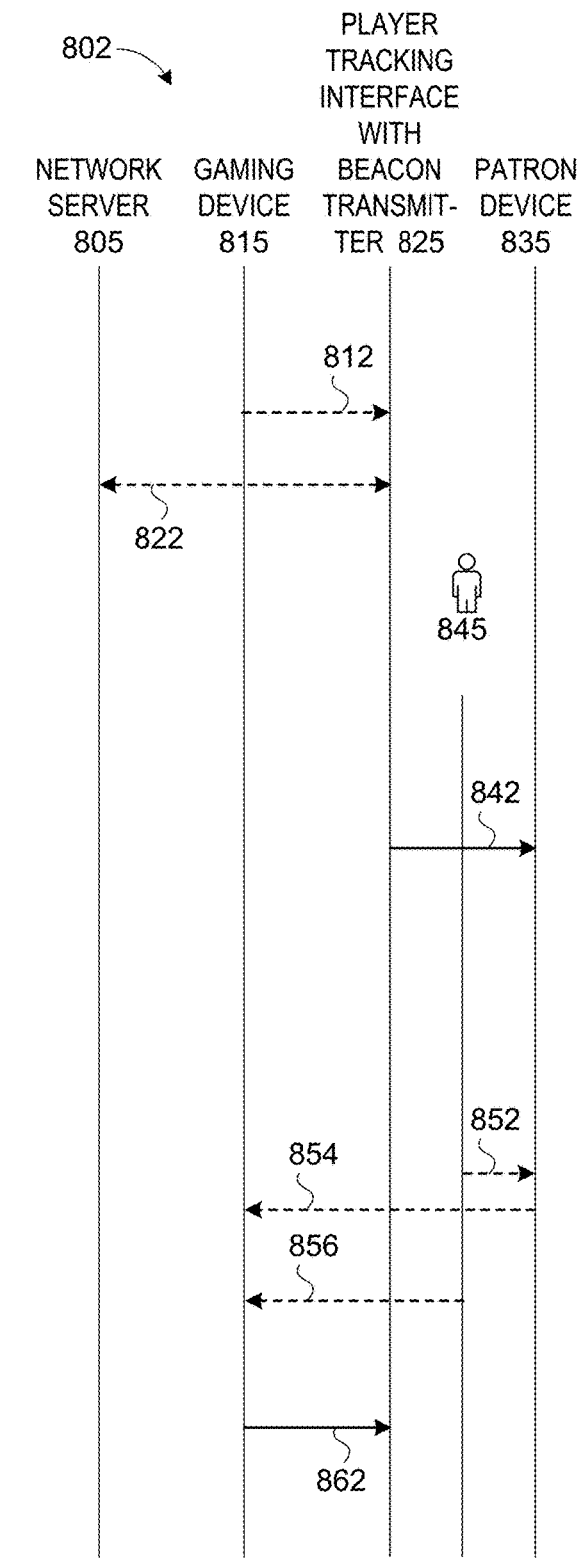
FIG. 9 is a sequence diagram illustrating certain operations of the first example method.

A first example method, for providing prompted digital interactions between a patron device 835 and a player tracking interface associated with an electronic gaming device, is described with the aid of FIGS. 8-9. FIG. 9 is a flowchart 801 and FIG. 9 is a sequence diagram 802 illustrating certain operations of the first method. In this method, a message is transmitted to a patron device and, in response, an indication associated with play at an electronic gaming device is received. The sequence diagram 802 shows interactions between four entities that can participate in this method: network server 805, gaming device 815, player tracking interface 825, and patron device 835. Patron 845 is also depicted. Sequence diagram 802 is an illustrative example of flowchart 801; other examples of flowchart 801 can be implemented with different entities.

Starting with the flowchart 801, at process block 840, a message can be transmitted on a wireless one-way channel from a transmitter near gaming device 815 to patron device 835. In some examples, this message can be transmitted by a Bluetooth® beacon transmitter incorporated within player tracking interface 825, and can be received by a Bluetooth® receiver of patron device 835, as illustrated by arrow 842. In some examples, the message can include a promotion or invitation for play at gaming device 815. However, neither of these are requirements, and other implementations can be used. In other examples, the beacon transmitter can be part of gaming device 815, or can be a distinct device coupled to gaming device 815 or to player tracking interface 825. The message can include a promotion for another promotional item not associated with gaming device 815, or the message can include a notification to the patron carrying patron device 835. Further, the message can be transmitted along with a beacon identifier which can be a default (or idle) identifier or a custom identifier. Alternatively, the promotion can be encoded within the beacon identifier, or can be transmitted in place of a beacon identifier.

At process block 860, and responsive to the message transmitted at block 840, an input can be received that is associated with play on gaming device 815. In some examples, the input can be received at player tracking interface 825 from gaming device 815, as illustrated by arrow 862. A patron near gaming device 815, who was not playing on gaming device 815 at the time block 840 was performed, can be led to commence play. Player tracking interface 825, which can be proximate to gaming device 815, can monitor gaming device 815 to receive the input indicating that the patron's play has begun. However, these are not requirements and other implementations can be used.

Numerous variations and extensions can be implemented. As an example, at block 807, a promotion can initially be displayed on gaming device 815 to a patron in the vicinity of gaming device 815. For example, the patron may be approaching or passing by gaming device 815. An indication can be received that the patron has accepted the promotion (arrow 812). For example, the patron may walk up to gaming device 815 and press a button or tap a touchscreen. Player tracking interface 825 can receive such indication by monitoring events on gaming machine 815. Thereupon, player tracking interface 825 can request and obtain a custom payload from network server 805 (arrow 822). The custom payload can be transmitted (arrow 842) on a one-way Bluetooth® beacon message from a transmitter of player tracking interface 825 to the patron device 835, along with a default identifier of the transmitter. Receipt of the custom payload can cause the promotion to be stored or displayed on patron device 835 at block 847. The default identifier allows the custom payload to be received by a patron device not already registered for gameplay on gaming device 815.

As another example, a message can be prepared incorporating a payload that indicates a promotion and an identifier of a beacon transmitter. The message can be transmitted on a one-way Bluetooth® beacon message from the beacon transmitter to the patron device 835. The beacon transmitter can be part of or attached to player tracking interface 825 or gaming device 815, or can be near gaming device 815. Receipt of the payload can cause the promotion to be stored on patron device 835. The patron can be near gaming device 815 but need not be registered at gaming device 815 when the message is transmitted. The patron can be playing on gaming device 815 as a guest, i.e. without being registered. In varying examples, the payload can be a default payload of player tracking interface 825 or can be a custom payload obtained from network server 805. The identifier can be a default identifier of the beacon transmitter, or can be a custom identifier obtained from network server 805. The identifier can be stored on patron device 835 upon receipt of the message. The method can extend to redeeming the promotion. In certain examples, redemption of the promotion can require presentation of at least part of the identifier (custom or default) or the payload (custom or default) stored on patron device 835.

In some examples, patron device 835 can be a smartphone, while in other examples patron device 835 can be a proprietary or commercial device incorporating a wireless network module. Patron device 835 can include e.g. Wi-Fi and Bluetooth® capabilities but need not have cellular telephony capability. Gaming device 815 can be a single player casino gaming device, a two-player casino gaming device, or a multi-player smart casino gaming table.

The transmitting at block 840 can be responsive to detection of a distance between patron device 835 and either gaming device 815 or player tracking interface 825, or responsive to detection of a change in such distance. Such detection can be at least partly based on a received signal strength on the wireless one-way communication channel.

In further examples, the message can be transmitted at block 840 to patron device 835 of patron 845 currently playing on gaming device 815. The message can be a promotion (such as a credit) for current play or for future play on gaming device 815. An elapsed time between transmission at block 840 and reception at block 860 can be less than ten minutes (e.g. an immediately valid promotion), less than an hour, less than 12 hours, or more than 12 hours (e.g. a promotion valid on the following day). The message can be customized for patron device 835, or can be a multicast message for a group of patron devices including patron device 835.

Additional operations can be performed between process blocks 840 and 860. Arrows 852, 854, 856 illustrate some optional operations whereby the input at block 860 is responsive to an action by patron 845 on either patron device 835 or gaming device 815. For example, responsive to the message of 840, which can be indicated on patron device 835, the associated patron 845 can perform an action (such as making a selection of an icon, a button press, or a voice input) on patron device 835 as illustrated by arrow 852, for example an action demonstrating an intent to play. Patron device 835 can convey an indication of this selection to gaming device 815 as illustrated by arrow 854. Alternatively, patron 845 can directly perform an action (such as pressing a Connect button, entering a code, issuing a voice command, providing a biometric input, or signing on in another way) at gaming device 815, as illustrated by arrow 856. Still further, patron device 835 can be presented at gaming device 815 to convey the intent of patron 845 to play on gaming device 815 by optical, NFC, acoustic, or another form of communication. In any of these scenarios, a resulting message from gaming device 815 can then lead to the input being received by player tracking interface 825 at block 860. Alternatively, these scenarios also illustrate the input being received at gaming device 815. In other examples, the receiving at block 860 can be performed at network server 805, as network server 805 is notified about the play of patron 845.

Additional operations can be performed prior to block 840. At optional block 820, a custom payload can be obtained from network server 805. The custom payload can be pushed from network server 805 to player tracking interface 825, or can be obtained in response to a request from player tracking interface 825 for the custom payload. Arrow 822 illustrates such communication between player tracking interface 825 and network server 805. Then, at block 830, a message can be constructed to incorporate the custom payload. This message can be transmitted at block 840 as disclosed herein. In some examples, the custom payload can have a size greater than an allowed payload size on the wireless one-way medium (for example, the custom payload can include an image file), and the message can comprise multiple portions of the custom payload to be transmitted successively or in rotation over the wireless one-way channel.

In further examples, the message at block 840 can be a broadcast message which any patron device 835 may be eligible to receive and act on. The message can be decoded on patron device 835 to notify patron 845 of the proximity of gaming device 815. The message can be a default message of the transmitter.

In other examples, an action by patron 845 (e.g. indicating an intent to play) can lead to an indication being transmitted to network server 805 (e.g. from patron device 835 or from gaming device 815). Responsive to this indication, the input of block 860 can be transmitted directly to player tracking interface 825. Alternatively, an auxiliary indication can be forwarded from network server 805 to gaming device 815, whence the input can be received by player tracking interface 825 through monitoring communications of gaming device 815.

The input of block 860 can include information identifying patron 845 or patron device 835. In further examples, the input can be received by player tracking interface 825 directly from patron device 835, by optical, acoustic, or NFC communication, or by a wireless link according to a different standard than the wireless one-way communication channel.

The first method, including variations or extensions not limited to those described herein, can be performed by one or more hardware processors executing instructions stored on computer-readable media. Accordingly, such media can embody portions of the disclosed technologies.

A second example method, for managing interactions between a patron device and a player tracking interface associated with an electronic gaming device, is described with the aid of FIGS. 10-11. FIG. 10 is a flowchart 1001 and FIG. 11 is a sequence diagram 1002 illustrating certain operations of the second method. In this method, a player tracking interface sends a message to a patron device based on monitoring a nearby gaming device. The sequence diagram 1002 shows interactions between four entities that can participate in this method: network server 1005, gaming device 1015, player tracking interface 1025, and patron device 1035. Sequence diagram 1002 is an illustrative example of flowchart 1001; other examples of flowchart 1001 can be implemented with different entities.

Starting with the flowchart 1001, at process block 1010, player tracking interface 1025 can monitor gaming device 1015, as shown by arrow 1012. In some examples, player tracking interface 1025 can be coupled to monitor wired communications between gaming device 1015 and network server 1005 or other devices on a casino management network. In other examples, player tracking interface 1025 can be configured to monitor wireless communications between gaming device 1015 and network server 1005. In examples, monitoring can occur when a player tracking card is inserted into player tracking interface 1025, or when a patron is registered to gaming device 1015 as described in context of FIG. 3. The monitoring can provide an indication of play on gaming device 1015. The indication of play can be an indication of a recent play event, such as a completed game, a win, or a loss; an indication of cumulative play for the patron, such as for a current play session at gaming device 1015, for a current day, month, or year, or over the patron's lifetime history; or an indication of pace of play, such as an indication that the patron's play has sped up or slowed down, or is greater or less than corresponding thresholds. A pace of play can be measured in games, or wagered amounts, or other metrics of play. Thresholds can be customized according to the patron's profile or history.

At process block 1040, responsive to the monitoring, player tracking interface 1025 can transmit a message to patron device 1035 via a wireless one-way communication channel. In some examples, this message can be transmitted by a Bluetooth® beacon transmitter incorporated within player tracking interface 1025, and can be received by a Bluetooth® receiver of patron device 1035, as illustrated by arrow 1042. Player tracking interface 1025 can be near, attached to, or located partly or wholly within gaming device 1015.

Numerous variations and extensions can be deployed. As an example, at block 1007, the method can initially display a promotion on gaming device 1015 to a patron registered and playing on gaming device 1015. Upon receipt of an indication that the patron has accepted the promotion on gaming device 1015 (arrow 1012), player tracking interface 1025 can request and obtain a custom payload (indicative of the promotion) and custom identifier (specifically targeted to patron device 1035) from network server 1005 (arrows 1022). The custom payload can be packaged with the custom identifier and transmitted as a Bluetooth® beacon message to patron device 1035 (blocks 1030, 1040; arrow 1042). Receipt of the message at the patron device 1035 can cause the promotion to be displayed or stored, at block 1050, on patron device 1035 by a casino app on patron device 1035. The targeted custom identifier can prevent the promotion from being received by other patron devices. In other examples, the player tracking interface 1025 can already be in possession of the custom identifier for the current patron (e.g. from when the patron registered or commenced play on gaming device 1015), and only the custom payload is requested and obtained at arrows 1022. The custom identifier and/or the custom payload can be transmitted for a predetermined period of time, such as in a range from 10 s to 10 minutes ("min"), from 30 s to 3 min, or about one minute. A targeted custom identifier used as or in conjunction with delivery of a promotion at block 1040 can be different from a custom identifier used in conjunction with registration, as described in the context of block 440.

As another example, player tracking interface 1025 can request and obtain a custom identifier (indicative of a promotion, and specifically targeted to patron device 1035) from network server 1005 (arrows 1022) for a patron registered for play on gaming device 1015. A message containing the custom identifier can be transmitted on a one-way wireless beacon message from a transmitter near gaming device 1015. The transmitter can be part of player tracking interface 1025. Receipt of the custom identifier can cause the promotion to be displayed on patron device 1035. The method can extend to redemption of the promotion which, in some examples, can require presentation or retrieval of the custom identifier from patron device 1035.

In some examples, patron device 1035 can be a smartphone, while in other examples patron device 1035 can be a proprietary or commercial device incorporating a wireless network module. Patron device 1035 can include e.g. Wi-Fi and Bluetooth® capabilities but need not have cellular telephony capability. Gaming device 1015 can be a single player casino gaming device, a two-player casino gaming device, or a multi-player smart casino gaming table.

The message transmitted at block 1040 can be transmitted to patron device 1035 of a patron currently playing on gaming device 1015, or to a different patron. For example, the monitoring at block 1010 can indicate that the current player is terminating play on gaming device 1015, and an invitation can be sent to a different patron in the vicinity of gaming device 1015.

The message can include a promotion for play on gaming device 1015 (either for current play or for a future play), for play on another gaming device distinct from gaming device 1015 (for example if a patron is terminating play at gaming device 1015), or for a non-gaming activity (e.g. a meal, an event ticket, or a spa session).

The second method, including variations or extensions not limited to those described herein, can be performed by one or more hardware processors executing instructions stored on computer-readable media. Accordingly, such media can embody portions of the disclosed technologies.

Numerous embodiments are described in this disclosure, and are presented for illustrative purposes only. The described embodiments are not, and are not intended to be, limiting in any sense. The presently disclosed embodiments are widely applicable to numerous embodiments, as is readily apparent from the disclosure. One of ordinary skill in the art will recognize that the disclosed embodiments may be practiced with various modifications and alterations, such as structural, logical, software, or electrical modifications. Although particular features of the disclosed embodiments may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the disclosure that must be present in all embodiments.

The Title (set forth at the beginning of the first page of this disclosure) is not to be taken as limiting in any way as to the scope of the disclosed embodiments.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements. Further, the terms "coupled" or "attached" encompass mechanical, electrical, magnetic, optical, as well as other practical ways of coupling or linking items together, and does not exclude the presence of intermediate elements between the coupled items. Furthermore, as used herein, the terms "or" and "and/or" mean any one item or combination of items in the phrase.

When a single device, component, structure, or article is described herein, more than one device, component, structure or article (whether or not they cooperate) may alternatively be used in place of the single device, component, or article that is described. Accordingly, the functionality that is described as being possessed by a device may alternatively be possessed by more than one device, component, or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality and/or features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present specification. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although a process may be described as including a plurality of steps, that does not indicate that all or even any of the steps are essential or required. Various other embodiments within the scope of the disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the disclosure include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

For the sake of presentation, the detailed description uses terms like "determine" and "select" to describe computer operations in a computer system. These terms denote operations performed by a computer, and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the terms "send" or "transmit" denote any way of conveying information from one component to another component, and the terms "receive" or "obtain" denote any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to ensure privacy and prevent fraud in any of a variety of ways well known in the art.

It will be readily apparent that the various methods and algorithms described herein may be implemented by a control system and/or the instructions of the software may be designed to carry out the processes of the present specification.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases or data structures presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

It will be readily apparent that the various methods and algorithms described herein may be implemented by, e.g., appropriately programmed general-purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments. Some of these embodiments may not be claimed in the present application, but may nevertheless be claimed in one or more continuing applications that claim the benefit of priority of the present application. Applicant may file additional applications to pursue patents for subject matter that has been disclosed and enabled but not claimed in the present application.

The foregoing description discloses only exemplary embodiments. Modifications of the above disclosed apparatus and methods which fall within the scope of the disclosure will be readily apparent to those of ordinary skill in the art. For example, although the examples discussed above are illustrated for a gaming market, embodiments of the specification can be implemented for other markets. The gaming system environment of the examples is not intended to suggest any limitation as to the scope of use or functionality of any aspect of the disclosure.

In view of the many possible embodiments to which the principles of the specification may be applied, it should be recognized that the illustrated embodiments are only preferred examples of the disclosure and should not be taken as limiting the scope of the disclosure. Rather, the scope of the disclosure is defined by the following claims.

While various embodiments have been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system comprising:
   one or more transmitters storing a plurality of frames, the plurality of frames including a first frame associated with registered player accounts; and
   a server comprising at least one processor in communication with in at least one memory storing instructions, which when executed, cause the at least one processor to:
   determine a location of a mobile computing device;
   determine that the mobile computing device is one of associated with a registered player account or not associated with a registered player account;
   determine at least one transmitter of the one or more transmitters based on the location of the mobile computing device;
   when the mobile computing device is associated with a registered player account, cause the at least one transmitter to broadcast a first message, based on the first frame of the plurality of frames, to the mobile computing device; and
   when the mobile computing device is not associated with a registered player account, cause the at least one transmitter to broadcast a second message, based on a second frame of the plurality of frames, to the mobile computing device.

2. The electronic gaming system of claim 1, wherein the instructions further cause the at least one processor to determine the location of the mobile computing device based on at least one of a message received from an electronic gaming device or a message received from the mobile computing device.

3. The electronic gaming system of claim 1, wherein the instructions further cause the at least one processor to configure the one or more transmitters with the plurality of frames.

4. The electronic gaming system of claim 1, wherein the first frame is a custom frame, and wherein the instructions further cause the at least one processor to, when the mobile computing device is associated with a registered player account:
   determine a targeted interaction event for the mobile computing device;
   reconfigure the first frame based on the targeted interaction event; and
   cause the at least one transmitter to broadcast the first message after the first frame is reconfigured.

5. The electronic gaming system of claim 4, wherein the instructions further cause the at least one processor to:
   receive a response message from the mobile computing device based on an input at the mobile computing device; and
   register the registered player account associated with the mobile computing device with a promotion associated with the targeted interaction event based on the response message.

6. The electronic gaming system of claim 1, wherein the second frame is a default frame.

7. The electronic gaming system of claim 1, wherein the plurality of frames includes a third frame associated with an advertisement, and wherein the instructions further cause the at least one processor to cause the at least one transmitter to broadcast a third message, based on the third frame of the plurality of frames, to the mobile computing device.

8. At least one non-transitory computer-readable storage medium with instructions stored thereon that, in response to execution by at least one processor in communication with one or more transmitters storing a plurality of frames including a first frame associated with registered player accounts, cause the at least one processor to:
identify a location of a mobile computing device;
identify that the mobile computing device is one of associated with a registered player account or not associated with a registered player account;
identify at least one transmitter of the one or more transmitters based on the location of the mobile computing device;
when the mobile computing device is associated with a registered player account, control the at least one transmitter to transmit a first message, based on the first frame of the plurality of frames, to the mobile computing device; and
when the mobile computing device is not associated with a registered player account, control the at least one transmitter to transmit a second message, based on a second frame of the plurality of frames, to the mobile computing device.

9. The at least one non-transitory computer-readable storage medium of claim 8, wherein the instructions further cause the at least one processor to identify the location of the mobile computing device based on at least one of a message received from an electronic gaming device or a message received from the mobile computing device.

10. The at least one non-transitory computer-readable storage medium of claim 8, wherein the instructions further cause the at least one processor to configure the one or more transmitters with the plurality of frames.

11. The at least one non-transitory computer-readable storage medium of claim 8, wherein the first frame is a custom frame, and wherein the instructions further cause the at least one processor to, when the mobile computing device is associated with a registered player account:
identify a targeted interaction event for the mobile computing device;
control the first frame to be reconfigured based on the targeted interaction event; and
control the at least one transmitter to broadcast the first message after the first frame is reconfigured.

12. The at least one non-transitory computer-readable storage medium of claim 11, wherein the instructions further cause the at least one processor to:
receive a response message from the mobile computing device based on an input at the mobile computing device; and
register the registered player account associated with the mobile computing device with a promotion associated with the targeted interaction event based on the response message.

13. The at least one non-transitory computer-readable storage medium of claim 8, wherein the second frame is a default frame.

14. The at least one non-transitory computer-readable storage medium of claim 8, wherein the plurality of frames includes a third frame associated with an advertisement, and wherein the instructions further cause the at least one processor to control the at least one transmitter to broadcast a third message, based on the third frame of the plurality of frames, to the mobile computing device.

15. A method of controlling one or more transmitters implemented by at least one processor in communication with at least one memory, the one or more transmitters storing a plurality of frames including a first frame associated with registered player accounts, the method comprising:
determining a location of a mobile computing device;
determining that the mobile computing device is one of associated with a registered player account or not associated with a registered player account;
determining at least one transmitter of the one or more transmitters based on the location of the mobile computing device;
when the mobile computing device is associated with a registered player account, causing the at least one transmitter to broadcast a first message, based on the first frame of the plurality of frames, to the mobile computing device; and
when the mobile computing device is not associated with a registered player account, causing the at least one transmitter to broadcast a second message, based on a second frame of the plurality of frames, to the mobile computing device.

16. The method of claim 15, further comprising determining the location of the mobile computing device based on at least one of a message received from an electronic gaming device or a message received from the mobile computing device.

17. The method of claim 15, further comprising configuring the one or more transmitters with the plurality of frames.

18. The method of claim 15, wherein the first frame is a custom frame, and wherein the method further comprises, when the mobile computing device is associated with a registered player account:
determining a targeted interaction event for the mobile computing device;
reconfiguring the first frame based on the targeted interaction event; and
causing the at least one transmitter to broadcast the first message after the first frame is reconfigured.

19. The method of claim 18, further comprising:
receiving a response message from the mobile computing device based on an input at the mobile computing device; and
registering the registered player account associated with the mobile computing device with a promotion associated with the targeted interaction event based on the response message.

20. The method of claim 15, wherein the plurality of frames includes a third frame associated with an advertisement, and wherein the method further comprises causing the at least one transmitter to broadcast a third message, based on the third frame of the plurality of frames, to the mobile computing device.

* * * * *